US012689914B2

(12) United States Patent
Hong et al.

(10) Patent No.: US 12,689,914 B2
(45) Date of Patent: Jul. 21, 2026

(54) SIGNAL CONFIGURATION METHOD AND APPARATUS, DEVICE, AND STORAGE MEDIUM

(71) Applicant: VIVO MOBILE COMMUNICATION CO., LTD., Guangdong (CN)

(72) Inventors: Qi Hong, Guangdong (CN); Gen Li, Guangdong (CN); Hao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 408 days.

(21) Appl. No.: 18/344,048

(22) Filed: Jun. 29, 2023

(65) Prior Publication Data

US 2023/0354064 A1 Nov. 2, 2023

Related U.S. Application Data

(63) Continuation of application No. PCT/CN2021/142063, filed on Dec. 28, 2021.

(30) Foreign Application Priority Data

Dec. 31, 2020 (CN) .......................... 202011624856.8

(51) Int. Cl.
*H04W 16/10* (2009.01)
*H04L 27/26* (2006.01)
*H04W 24/02* (2009.01)

(52) U.S. Cl.
CPC ....... *H04W 24/02* (2013.01); *H04L 27/26025* (2021.01)

(58) Field of Classification Search
CPC ............. H04W 72/0453; H04W 72/23; H04W 72/0446; H04W 72/232; H04W 72/04;
(Continued)

(56) References Cited

U.S. PATENT DOCUMENTS 10,609,707 B2 * 3/2020 Lahetkangas ..... H04W 72/0446
2009/0257517 A1 * 10/2009 Nordstrom .......... H04L 27/2647
375/260

(Continued)

FOREIGN PATENT DOCUMENTS

CN 109714139 A 5/2019
CN 110536420 A 12/2019
(Continued)

OTHER PUBLICATIONS

Spreadtrum Communications, "Discussion on synchronization mechanism for NR V2x", 3GPP TSG RAN WG1 Meeting #98bis, R1-1910008, Chongqing, China, Oct. 14-20, 2019.
(Continued)

*Primary Examiner* — Quan M Hua
(74) *Attorney, Agent, or Firm* — Price Heneveld LLP

(57) ABSTRACT
This application discloses a signal configuration method and apparatus, a device, and a storage medium. The method includes: configuring, by a communications device based on first configuration information, a first periodic signal; where second configuration information in the first configuration information is determined based on a subcarrier spacing (SCS), and/or second configuration information in the first configuration information is predefined; and the first configuration information includes: periodicity configuration information; slot offset information; duration information; and symbol position configuration information.

19 Claims, 8 Drawing Sheets

(58) Field of Classification Search
CPC ......... H04W 72/1263; H04W 56/0015; H04W
74/0833; H04W 72/046; H04W 72/12;
H04W 24/02; H04W 56/0005; H04W
48/10; H04W 48/08; H04W 28/26; H04W
56/0045; H04W 72/54; H04W 92/18
See application file for complete search history.

(56) References Cited

U.S. PATENT DOCUMENTS

| | | |
|---|---|---|
| 2019/0306700 A1 | 10/2019 | Lin |
| 2020/0028659 A1 | 1/2020 | Huang et al. |
| 2020/0059878 A1* | 2/2020 | Huang ................. H04W 74/02 |
| 2020/0136882 A1* | 4/2020 | Jo ......................... H04L 5/1469 |
| 2020/0296759 A1 | 9/2020 | Agiwal et al. |
| 2020/0404629 A1 | 12/2020 | Wang et al. |
| 2021/0076361 A1 | 3/2021 | Takeda et al. |
| 2021/0235426 A1 | 7/2021 | Xia et al. |
| 2022/0052812 A1* | 2/2022 | Liu ....................... H04L 5/0094 |

FOREIGN PATENT DOCUMENTS

| | | | |
|---|---|---|---|
| CN | 112042239 A | 12/2020 | |
| EP | 3753194 | 12/2020 | |
| JP | 2019186927 A | 10/2019 | |
| WO | WO-2018130017 A1 * | 7/2018 | ......... H04L 27/2694 |
| WO | 2019142272 A1 | 7/2019 | |
| WO | 2019160660 A1 | 8/2019 | |
| WO | 2019223458 A1 | 11/2019 | |

OTHER PUBLICATIONS

ZTE, Sanechips, "Consideration on Finer Granularity of Periodic of CG/SPS", 3GPP TSG RAN WG2 Meeting #107, R2-1910400, Prague, Czech Republic, Aug. 26-30, 2019.

Lenovo, Motorola Mobility, PDCCH monitoring enhancements for NR from 52.6 GHz to 71GHz, 3GPP TSG RAN WG1 #104-e, R1-2100058, e-meeting, Jan. 25-Feb. 5, 2021.

* cited by examiner

A communications device configures a first periodic signal based on first configuration information    300

FIG. 3

SIGNAL CONFIGURATION METHOD AND APPARATUS, DEVICE, AND STORAGE MEDIUM

CROSS-REFERENCE TO RELATED APPLICATIONS

This application is a continuation application of PCT International Application No. PCT/CN2021/142063 filed on Dec. 28, 2021, which claims priority to Chinese Patent Application No. 202011624856.8, filed in China on Dec. 31, 2020, which are incorporated in their entireties by reference herein.

TECHNICAL FIELD

This application pertains to the field of communications technologies, and specifically relates to a signal configuration method and apparatus, a device, and a storage medium.

BACKGROUND

There are many kinds of signals in a 5G new radio (NR) system, and some of the signals are periodically configured, which means that a periodicity, an offset value, the number of consecutive slots, and the number of symbols in a single slot for a signal are given in configuration parameters. With the above configuration, a base station or user equipment (UE) is informed of where to find a required signal.

However, in a case that a large subcarrier spacing (SCS) is introduced into a communications system, if these periodic signals are still configured in an existing manner, complexity of blind detection of the UE will increase, and higher requirements are imposed on data processing capability of the UE.

SUMMARY

Embodiments of this application are intended to provide a signal configuration method and apparatus, a device, and a storage medium.

According to a first aspect, a signal configuration method is provided, where the method includes:

configuring, by a communications device based on first configuration information, a first periodic signal; where second configuration information in the first configuration information is determined based on a subcarrier spacing (SCS), and/or second configuration information in the first configuration information is predefined; and the first configuration information includes:
periodicity configuration information;
slot offset information;
duration information; and
symbol position configuration information.

According to a second aspect, a signal configuration apparatus is provided, where the apparatus includes:
a configuration module, configured to configure a first periodic signal based on first configuration information; where second configuration information in the first configuration information is determined based on a subcarrier spacing (SCS), and/or second configuration information in the first configuration information is predefined; and the first configuration information includes:
periodicity configuration information;
slot offset information;
duration information; and
symbol position configuration information.

According to a third aspect, a communications device is provided, where the communications device includes a processor, a memory, and a program or instructions stored in the memory and capable of running on the processor, where when the program or the instructions are executed by the processor, the steps of the method according to the first aspect are implemented.

According to a fourth aspect, a readable storage medium is provided, where the readable storage medium stores a program or instructions, and when the program or the instructions are executed by a processor, the steps of the method according to the first aspect are implemented.

According to a fifth aspect, a chip is provided, where the chip includes a processor and a communications interface, the communications interface is coupled to the processor, and the processor is configured to run a program or instructions to implement the steps of the method according to the first aspect.

According to a sixth aspect, an embodiment of this application provides a computer program product, where the computer program product is stored in a non-transitory storage medium, and the computer program product is executed by at least one processor to implement the method according to the first aspect.

BRIEF DESCRIPTION OF DRAWINGS

FIG. 3 is a schematic flowchart of a signal configuration method according to an embodiment of this application;

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates an "or" relationship between the associated objects.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than an NR system application, such as a sixth generation (6G) communications system.

Figure 1:
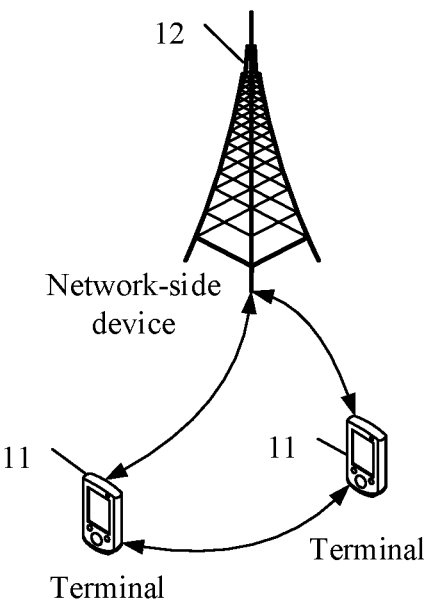
FIG. 1 is a structural diagram of a wireless communications system according to an embodiment of this application.

FIG. 1 is a structural diagram of a wireless communications system according to an embodiment of this application. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile Internet device (MID), a wearable device or a vehicle user equipment (VUE), or a pedestrian user equipment (PUE). The wearable device includes a wristband, an earphone, glasses, and the like. It should be noted that a specific type of the terminal 11 is not limited in the embodiments of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effects are achieved, the base station is not limited to a specific technical term. It should be noted that the base station in the NR system is merely used as an example in the embodiments of this application, but a specific type of the base station is not limited.

In order to better understand various embodiments of this application, the following is first described.
(1) Frame Structure
In order to support various frequency bands and deployment scenarios, new radio (NR) supports flexible numerology configurations. A numerology (denoted by μ) corresponds to a subcarrier spacing configuration (and cyclic prefix length) in the frequency domain. In NR, by multiplying the base subcarrier spacing (15 kHz) by an integer N (that is, expanding by a factor of N, where $N=2^n$, n being an integer), a variety of different numerologies are defined and as shown in Table 1 below.

TABLE 1

| Frame structure numerologies | | | |
| --- | --- | --- | --- |
| μ | SCS | Number of slots contained in a subframe (1 ms) | Slot duration (ms) |
| 0 | 15K | 1 | 1 |
| 1 | 30K | 2 | $\frac{1}{2}$ |
| 2 | 60K | 4 | $\frac{1}{4}$ |
| 3 | 120K | 8 | $\frac{1}{8}$ |
| 4 | 240K | 16 | $\frac{1}{16}$ |

As shown in Table 1, as the SCS increases, the number of slots contained in each subframe increases exponentially, while the slot duration decreases exponentially.
(2) Periodic Signal
There are many kinds of signals in NR, and some of the signals are periodically configured, which means that a periodicity, an offset value, the number of consecutive slots, and the number of symbols in a single slot for a signal are given in configuration parameters. With the above configuration, a base station or UE is informed of where to find a desired signal.

This type of periodic signal includes: search space configuration in a physical downlink control channel (PDCCH), channel state information reference signal (CSI-RS) resource configuration (NZP CSI-RS, ZP-CSIRS), tracking reference signal (TRS) resource configuration, received signal strength indicator (RSSI), synchronization signal and PBCH block measurement timing configuration (SSB-MTC) information, dedicated scheduling request (SchedulingRequestResourceConfig determines physical layer resources on PUCCH where the UE may send the dedicated scheduling request), sounding reference signal (SRS) resource configuration, and the like, where PUCCH refers to physical uplink control channel (PUCCH).

The search space configuration in the physical downlink control channel (PDCCH) is used as an example.
(3) PDCCH
A PDCCH is a downlink control channel, carrying downlink control information (DCI) for physical uplink shared channel (PUSCH) and physical downlink shared channel (PDSCH). In long term evolution (LTE), the PDCCH occupies full bandwidth in frequency domain and the first 1-3 symbols of each subframe in time domain. In NR, if PDCCH continues to occupy the full bandwidth in the same way as LTE, it is undoubtedly a waste of resources and imposes high requirements on user equipment (UE) (which uses a terminal as an example in the embodiments of this application), which is not conducive to reducing terminal costs. Therefore, the PDCCH in NR is in a bandwidth part (BWP) and does not occupy some fixed slots in time domain. Time and frequency resources for PDCCH are mainly determined by control resource set (CORESET) and search space.
(4) Control Resource Set (CORESET)
A CORESET is used to resolve a range problem of a PDCCH, such as a time domain length and a frequency domain range. The system bandwidth of NR is large (up to 400 M), if the static configuration method of LTE is followed (occupying the full system bandwidth), complexity of blind detection will be greatly increased. Therefore, a configurable CORESET may be used in NR, where a time domain length and a frequency domain range for the CORE-SET can be configured using system information or a dedicated radio resource control (RRC) message.

Specific meanings of configuration parameters involved in the RRC configuration are shown in Table 2 below.

TABLE 2

| CORESET configuration parameters | |
| --- | --- |
| Configuration Parameters | Content |
| CORESET identifier | CORESET ID is unique among all BWPs within a serving cell |
| duration (M) | the number of consecutive symbols for a CORESET |
| frequency domain resources | frequency domain resources for a CORESET |
| CCE-REG mapping relationship | a mapping relationship (indicating interleaving or non-interleaving) that a control channel element (CCE) corresponds to a specific resource element group (REG) |
| REG-bundle size (L) | REG-bundle size (fixed to 6 in the case of non-interleaving) |
| the number of interleaver rows (R) | the number of interleaver rows |
| shift index | indicates n shift when present, otherwise a cell ID |
| precoding granularity | indicating whether the precoder granularity of a demodulation reference signal (DMRS) is wideband precoding or narrowband precoding |
| a list of to-be-added PDCCHs configured by TCI/a list of to-be-released PDCCHs configured by TCI | transmission configuration indicator (TCI Configuration), that is, the quasi co-location (QCL) relationship between a DMRS of the PDCCH and a downlink reference signal (RS) (for example, CSI-RS or SSB) configured in TCI State |
| TCI index in DCI | whether a TCI index is indicated in DCI |

As can be learned from the RRC signaling that the CORESET configuration does not indicate a specific time domain position (but only the time domain duration (number of symbols) is given), while the specific time domain position is given by Search Space. This design allows for greater flexibility. A CORESET may be configured at any frequency domain position (a configuration parameter Fre-quencyDomainResources IE is a bitmap numbered by a physical resource block (PRB) of a current BWP).

(5) Search Space

Search space is used to resolve a problem of how to search by UE. There is a similar concept in LTE, and its purpose is to reduce complexity of blind detection of UE as much as possible. Unlike LTE, a search space in NR is specific to a CORESET, and NR may configure different search spaces for different pieces of UE. In other words, different blind detection schemes (such as a monitoring periodicity and a symbol start position to be monitored) are configured for different pieces of UE. As a result, the complexity of blind detection of the UE can be further reduced.

Specific meanings of configuration parameters involved in the RRC configuration are shown in Table 3 below.

6

TABLE 3

| Search space configuration parameters | |
| --- | --- |
| Configuration parameters | Content |
| searchspaceID | (0-39), with 0 representing a search space for remaining minimum system information (RMSI) of a physical broadcast channel (PBCH). The number of search spaces in each bandwidth part (BWP) is limited to 10. |
| controlResourceSetID | CORESET ID is unique among all BWPs within a serving cell. |
| searchSpace type | determining a DCI format and whether the search space is public or UE-specific. |
| number of candidates | the number of PDCCH candidates corresponding to each aggregation level. |
| monitoring slot periodicity and offset | a time interval for monitoring a search space set, in slot, and an offset. |

Assuming following configurations for a CORESET:
frequencyDomainResources=000111111111111—(3 0s, 12 1s):
representing that the CORESET with 12 consecutive PRBs starts from a PRB that is three PRBs offset relative to a position of PRB0; and
Duration=2: representing that this CORESET occupies 2 consecutive OFDM symbols.
Assume that a search space is configured as follows:
monitoringSlotPeriodicityAndOffset=s14.2: representing that a search space periodicity is 4 slots and that an offset is 2 slots;
monitoringSymbolsWithinSlot=00100000100000: representing that in each slot, there are two occasions starting from the 3rd symbol and the 9th symbol respectively; and
Duration=2 representing that a search space spans 2 consecutive slots and is present in each slot.

Figure 2:
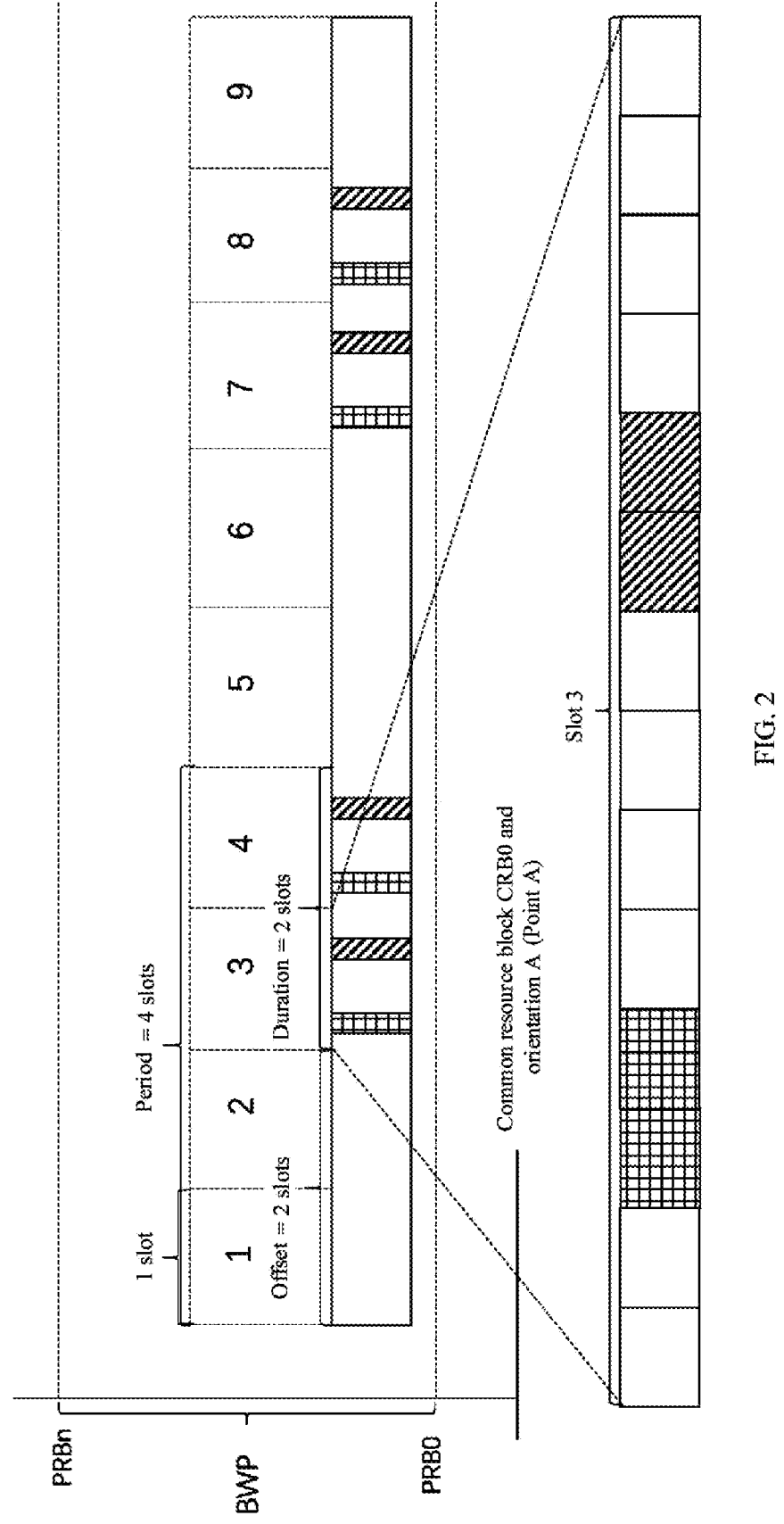
FIG. 2 is a schematic diagram of a signal configuration according to an embodiment of this application.

FIG. 2 is a schematic diagram of a signal configuration according to an embodiment of this application. FIG. 2 shows a signal configuration diagram based on the foregoing CORESET and search space.

The following describes in detail a signal configuration method and apparatus provided in this embodiment of this application by using some embodiments and application scenarios thereof with reference to the accompanying drawings.

Figure 3:
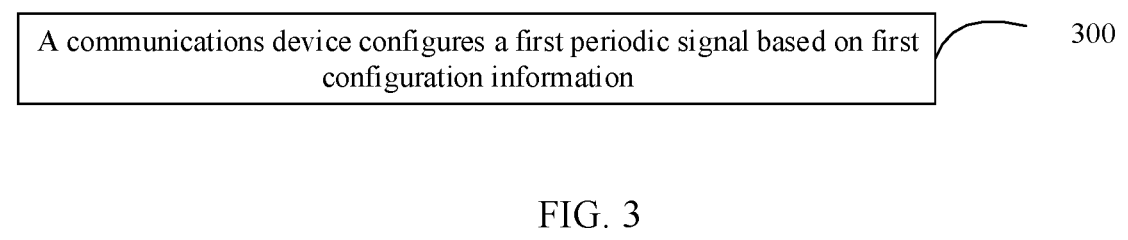

FIG. 3 is a schematic flowchart of a signal configuration method according to an embodiment of this application. As shown in FIG. 3, the method includes the following steps.

Step 300: A communications device configures a first periodic signal based on first configuration information, where
second configuration information in the first configuration information is determined based on a subcarrier spacing (SCS), and/or second configuration information in the first configuration information is predefined; and
the first configuration information includes:
periodicity configuration information;
slot offset information;
duration information; and
symbol position configuration information.
Optionally, the communications device may be a terminal.
Optionally, the communications device may be a network-side device.
Optionally, the configuration information of the periodic signal may be redefined or updated to overcome the fact that using a larger SCS will result in a smaller maximum periodicity that the SCS supports.

Optionally, the configuration information of the periodic signal may be redefined or updated based on a value of the SCS.

Optionally, the first configuration information is information required for configuring the first periodic signal.

Optionally, the second configuration information is some or all of the configuration information that is redefined or updated based on the value of the SCS, or some or all of the configuration information may be predefined directly.

Optionally, in the B52.6 GHz system, a large subcarrier spacing (SCS) may be introduced, for example, 480K/960K SCS. Therefore, it may happen that the number of slots contained in one subframe increases while each slot occupies a small amount of time. In this case, based on UE capability, that is, in consideration of complexity of blind detection of the UE and data processing capability of the UE, a configuration with some short periods in a search space, for example, may not be applicable in many periodic signals, such as a configuration with a periodicity of 1, 2, or 4 slots. If a configuration with a long periodicity is used, its overheads accounts for a large proportion, for example, for a periodicity of 80 slots, 7 bits are required for configuring its offset ($2^7$=128>80). For existing configurations, 2560 slots as a periodicity are supported at maximum, which is 320 ms for 120K SCS. If a larger SCS, for example, 960K SCS, is used and 2560 slots are still used as a periodicity, the periodicity is 40 ms. Therefore, using a larger SCS will result in a smaller maximum periodicity that the SCS supports.

Therefore, to overcome the foregoing drawbacks, some or all of the configuration information can be redefined or updated based on the value of the SCS, or some or all of the configuration information can be predefined directly.

Optionally, the communications device may configure a first periodic signal based on the periodicity configuration information, slot offset information, duration information, and symbol position configuration information; where all or some of the configuration information (that is, the second configuration information) is determined based on a subcarrier spacing (SCS), and/or all or some of the configuration information (that is, the second configuration information) is predefined.

Optionally, the first periodic signal is a signal of any periodicity configuration, that is, the periodicity, offset value, number of consecutive slots, number of symbols occupied in a single slot for the signal are given in the configuration parameters.

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

Optionally, the second configuration information includes at least one of the following:
  periodicity configuration information;
  slot offset information;
  duration information; and
  symbol position configuration information.

Optionally, all or some of the information of configuration of the periodic signal may be predefined or updated, so that the second configuration information may include any one or a combination of the following:
  periodicity configuration information;
  slot offset information;
  duration information; and
  symbol position configuration information.

Optionally, only one or more types of configuration information may be updated or predefined, or only another type or types of configuration information may be updated or predefined, or a plurality of types of information may be updated or predefined at the same time.

For example, only the periodicity configuration information may be updated or predefined; or only the slot offset information may be updated or predefined; or both the periodicity configuration information and the slot offset information may be updated or predefined. This is not limited in this embodiment, and the same is also applicable to other combinations of second configuration information.

Optionally, one or more types of the configuration information may be updated or predefined in a same manner or in different manners; or one or more types of the configuration information may be predefined, and one or more same or different types of configuration information may be updated later during signal configuration, which is not limited in this embodiment.

For example, the periodicity configuration information and the slot offset information may be updated or predefined in a same manner or in different manners; or the periodicity configuration information may be predefined and the slot offset information may be updated during signal configuration; or the slot offset information may be predefined and the periodicity configuration information may be updated during signal configuration. This is not limited in this embodiment, and the same is also applicable to other combinations of second configuration information.

In this embodiment of this application, a variety of possibilities for updating or predefining the second configuration information of configuration of the periodic signal can be provided, enabling more flexible configuration of the periodic signal.

Optionally, when the second configuration information includes the periodicity configuration information and/or the slot offset information, the determining the second configuration information based on the subcarrier spacing (SCS) includes:
  updating the second configuration information based on the subcarrier spacing (SCS); or
  predefining the second configuration information based on the subcarrier spacing (SCS).

Optionally, the periodicity configuration information and/or the slot offset information may be updated or redefined. In other words, the communications device may update the second configuration information based on the subcarrier spacing (SCS) when the second configuration information includes the periodicity configuration information and/or the slot offset information, or, the communications device may predefine the second configuration information based on the subcarrier spacing (SCS).

Optionally, the communications device may update the second configuration information based on the subcarrier spacing (SCS) when the first periodic signal is configured, that is, update the periodicity configuration information and/or the slot offset information.

Optionally, the second configuration information associated with the subcarrier spacing (SCS) may be preset by a system or predetermined by a protocol prior to the configuration of the first periodic signal, and when configuring the first periodic signal, the communications device may directly use the predefined second configuration information, that is, update the periodicity configuration information and/or the slot offset information.

Optionally, when the second configuration information includes the periodicity configuration information, the communications device may update the periodicity configuration information based on the subcarrier spacing (SCS) or may predefine the periodicity configuration information based on the subcarrier spacing (SCS), and the communications device uses the predefined periodicity configuration information when configuring the first periodic signal.

Optionally, when the second configuration information includes the slot offset information, the communications device may update the slot offset information based on the subcarrier spacing (SCS) or may predefine the slot offset information based on the subcarrier spacing (SCS), and the communications device uses the predefined slot offset information when configuring the first periodic signal.

For example, in an example of updating monitoringSlotPeriodicityAndOffset for a search space based on a subcarrier spacing (SCS), when configuring the first periodic signal, the communications device multiplies a periodicity value in the monitoringSlotPeriodicityAndOffset for the search space directly by a fixed value on the basis of an originally configured value to obtain an updated value and may determine a periodicity of the first periodic signal based on the updated periodicity value.

For example, in an example of updating monitoringSlotPeriodicityAndOffset for a search space based on a subcarrier spacing (SCS), a new periodicity value in the monitoringSlotPeriodicityAndOffset for the search space may be predefined, and this predefined periodicity value may be determined by directly multiplying a fixed value on the basis of an original value. The communications device may determine a periodicity of the first periodic signal based on the predefined new periodicity value.

For example, in an example of updating monitoringSlotPeriodicityAndOffset for a search space based on a subcarrier spacing (SCS), when configuring the first periodic signal, the communications device multiplies an offset representing the slot offset information in the monitoringSlotPeriodicityAndOffset for the search space directly by a fixed value on the basis of an originally configured value to obtain an updated value and may determine a position of the first slot for the first periodic signal based on the updated offset value.

For example, in an example of updating monitoringSlotPeriodicityAndOffset for a search space based on a subcarrier spacing (SCS), a new value of an offset representing the slot offset information in the monitoringSlotPeriodicityAndOffset for the search space may be predefined, and this predefined offset value representing slot offset information may be determined by directly multiplying a fixed value on the basis of an original value. The communications device may determine a position of the first slot for the first periodic signal based on the predefined new offset value representing slot offset information.

Optionally, the determining the second configuration information based on the subcarrier spacing (SCS) includes:
  determining a first calculation parameter corresponding to the SCS based on the subcarrier spacing (SCS) and obtain the second configuration information through calculation based on the first calculation parameter; or
  determining a first mathematical relation between the SCS and a preset target reference SCS based on the subcarrier spacing (SCS) and obtaining the second configuration information through calculation based on the first mathematical relation.

Optionally, in updating the periodicity configuration information based on the subcarrier spacing (SCS), or predefining the periodicity configuration information based on the subcarrier spacing (SCS), a first calculation parameter corresponding to the SCS can be determined based on the subcarrier spacing (SCS), and the periodicity configuration information is obtained through calculation based on the first calculation parameter.

Optionally, in updating the periodicity configuration information based on the subcarrier spacing (SCS), or predefining the periodicity configuration information based on the subcarrier spacing (SCS), a first mathematical relation between the SCS and a preset target reference SCS may be determined based on the subcarrier spacing (SCS), and the periodicity configuration information is obtained through calculation based on the first mathematical relation.

Optionally, in updating the slot offset information based on the subcarrier spacing (SCS), or predefining the slot offset information based on the subcarrier spacing (SCS), a first calculation parameter corresponding to the SCS can be determined based on the subcarrier spacing (SCS), and the slot offset information is obtained through calculation based on the first calculation parameter.

Optionally, in updating the slot offset information based on the subcarrier spacing (SCS), or predefining the slot offset information based on the subcarrier spacing (SCS), a first mathematical relation between the SCS and a preset target reference SCS may be determined based on the subcarrier spacing (SCS), and the slot offset information is obtained through calculation based on the first mathematical relation.

Optionally, a calculation rule in this embodiment may be predefined, that is, may be preconfigured or be predetermined by a protocol.

Optionally, one or more types of the configuration information may be updated or predefined in a same calculation manner or in different calculation manners. This is not limited in this embodiment, and the same is also applicable to other combinations of information.

Optionally, the obtaining the second configuration information through calculation based on the first calculation parameter includes:
  multiplying original second configuration information by the first calculation parameter to obtain the second configuration information.

Optionally, in updating the periodicity configuration information based on the subcarrier spacing (SCS), or predefining the periodicity configuration information based on the subcarrier spacing (SCS), a first calculation parameter corresponding to the SCS can be determined based on the subcarrier spacing (SCS), and the periodicity configuration information is obtained by multiplying original periodicity configuration information by the first calculation parameter.

Optionally, in updating the periodicity configuration information based on the subcarrier spacing (SCS), or predefining the periodicity configuration information based on the subcarrier spacing (SCS), a first calculation parameter corresponding to the SCS can be determined based on the subcarrier spacing (SCS), and the slot offset information is obtained by multiplying original slot offset information by the first calculation parameter.

For example, in updating the periodicity configuration information based on the subcarrier spacing (SCS), or predefining the periodicity configuration information based on the subcarrier spacing (SCS), a first calculation parameter 4 corresponding to the SCS can be determined based on the subcarrier spacing (SCS) of 480 kHz, and the periodicity configuration information in the second configuration information is obtained by multiplying original periodicity configuration information by 4. A first calculation parameter 8 corresponding to the SCS can be determined based on the subcarrier spacing (SCS) of 960 kHz, and the periodicity configuration information in the second configuration information is obtained by multiplying original periodicity configuration information by 8.

For example, in updating the slot offset information based on the subcarrier spacing (SCS), or predefining the slot offset information based on the subcarrier spacing (SCS), a first calculation parameter 4 corresponding to the SCS can be determined based on the subcarrier spacing (SCS) of 480 kHz, and the slot offset information in the second configuration information is obtained by multiplying original slot offset information by 4. A first calculation parameter 8 corresponding to the SCS can be determined based on the subcarrier spacing (SCS) of 960 kHz, and the slot offset information in the second configuration information is obtained by multiplying original slot offset information by 8.

Optionally, the determining a first mathematical relation between the SCS and a preset target reference SCS based on the subcarrier spacing (SCS) and obtaining the second configuration information through calculation based on the first mathematical relation includes:

determining, based on the subcarrier spacing (SCS), that the SCS is P times a preset first reference SCS; and multiplying the original second configuration information by the multiplier P to obtain the second configuration information; where $0 < P \leq 1$, or P is a positive integer.

Optionally, in updating the periodicity configuration information based on the subcarrier spacing (SCS), or predefining the periodicity configuration information based on the subcarrier spacing (SCS), it may be determined based on the subcarrier spacing (SCS) that the SCS is P times a preset first reference SCS, and the periodicity configuration information is obtained by multiplying the original periodicity configuration information with the multiplier P to obtain the periodicity configuration information.

Optionally, taking a first reference SCS of 120 kHz as an example, if a subcarrier spacing (SCS) of a BWP is 480 kHz, 480/120=4, the original periodicity configuration information may be multiplied by 4 to obtain the periodicity configuration information.

Optionally, in updating the slot offset information based on the subcarrier spacing (SCS), or predefining the slot offset information based on the subcarrier spacing (SCS), it may be determined based on the subcarrier spacing (SCS) that the SCS is P times a preset first reference SCS, and the periodicity configuration information is obtained by multiplying the original periodicity configuration information with the multiplier P to obtain the slot offset information.

Optionally, taking a first reference SCS of 120 kHz as an example, if a subcarrier spacing (SCS) of a BWP is 480 kHz, 480/120=4, the original slot offset information may be multiplied by 4 to obtain the slot offset information.

Optionally, the first reference SCS can be preset or predetermined by a protocol.

Optionally, when the second configuration information includes the periodicity configuration information and/or the slot offset information, the predefining the second configuration information includes:

predefining the periodicity configuration information and/ or the slot offset information.

Optionally, the periodicity configuration information may be predefined, and the communications device may perform configuration based on the predefined periodicity configuration information when configuring the first periodic signal.

Optionally, the slot offset information may be predefined, and the communications device may perform configuration based on the predefined slot offset information when configuring the first periodic signal.

For example, in an example of updating monitoringSlotPeriodicityAndOffset for a search space based on a subcarrier spacing (SCS), a new periodicity value in the monitoringSlotPeriodicityAndOffset for the search space may be predefined. The communications device may determine a periodicity of the first periodic signal based on the predefined new periodicity value.

For example, in an example of updating monitoringSlotPeriodicityAndOffset for a search space based on a subcarrier spacing (SCS), a new value of an offset representing the slot offset information in the monitoringSlotPeriodicityAndOffset for the search space may be predefined. The communications device may determine a position of the first slot for the first periodic signal based on the predefined new offset value representing slot offset information.

Optionally, only the periodicity configuration information may be predefined; or only the slot offset information may be predefined; or both the periodicity configuration information and the slot offset information may be predefined. This is not limited in this embodiment, and the same is also applicable to other combinations of second configuration information.

Figure 4:
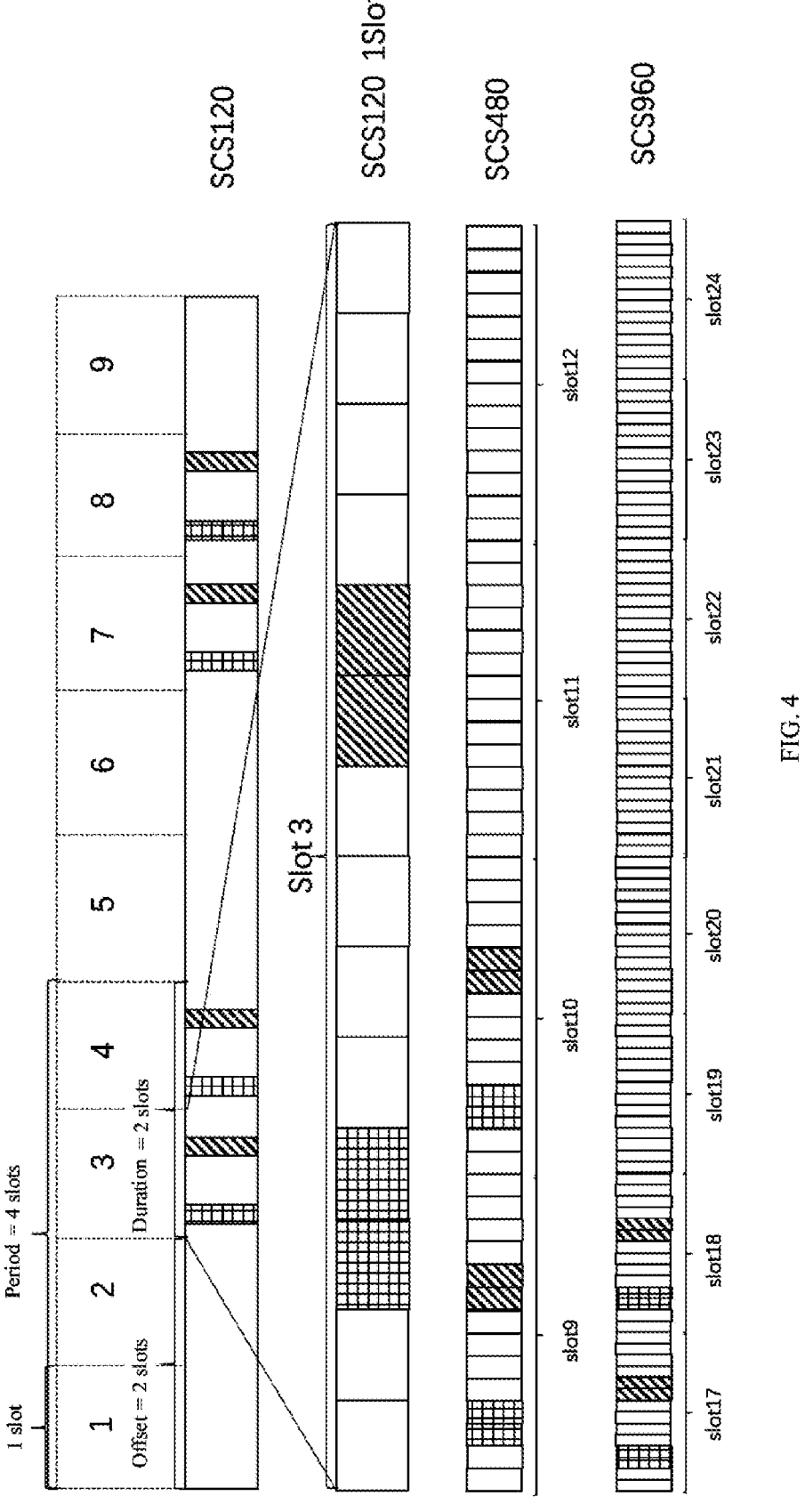
FIG. 4 is a first schematic diagram of a signal configuration method according to an embodiment of this application.

In an example in which the second configuration information includes the periodicity configuration information and the slot offset information, FIG. 4 is a first schematic diagrams of a signal configuration method according to an embodiment of this application. In this embodiment of this application, a periodicity and an initial slot for PDCCH monitoring may be determined by modifying the definition of monitoringSlotPeriodicityAndOffset, then a position(s) of subsequent slot(s) may be determined according to already existing definition of Duration in the system, and a position of a PDCCH monitoring symbol in each slot may be determined by using monitoringSymbolsWithinSlot. For example, the definition of monitoringSlotPeriodicityAndOffset may be modified, that is, multiplying periodicity and offset information carried by monitoringSlotPeriodicityAndOffset by a fixed value according to specified rules, while remaining parameters, such as monitoringSymbolsWithinSlot and Duration, remain unchanged.

As shown in FIG. 4, assuming following configurations for a CORESET:

frequencyDomainResources=000111111111111—(3 0s, 12 1s):

representing that the CORESET with 12 consecutive PRBs starts from a PRB that is three PRBs offset relative to a position of PRB0; and Duration=2: representing that this CORESET occupies 2 consecutive OFDM symbols.

Assume that a search space is configured as follows:

monitoringSlotPeriodicityAndOffset=s14.2: representing that a search space periodicity is 4 slots and that an offset is 2 slots;

monitoringSymbolsWithinSlot=00100000100000: representing that in each slot, there are two occasions starting from the 3rd symbol and the 9th symbol respectively; and Duration=2 representing that a search space spans 2 consecutive slots and is present in each slot.

As shown in FIG. 4, when SCS=480K, the periodicity and offset information carried by monitoringSlotPeriodicity-AndOffset can be multiplied by 4; when SCS=960K, the periodicity and offset information carried by monitoring-SlotPeriodicityAndOffset can be multiplied by 8; and then a position of an initial slot is obtained. The initial slot may be any one in a slot group. For example, slots 9, 10, 11, and 12 are in a group in FIG. 4, and the initial slot can be any one of them.

Then, a position(s) of a subsequent slot(s) may be determined according to the already existing definition of Duration, and a position of a PDCCH monitoring symbol in each slot is determined by using monitoringSymbolsWithinSlot. As shown in FIG. 4, Duration=2, meaning that it lasts for two slots. monitoringSymbolsWithin-Slot=00100000100000: representing that in each slot, there are two occasions starting from the 3rd symbol and the 9th symbol respectively; and Optionally, when the second configuration information includes the symbol position configuration information, the determining the second configuration information based on the subcarrier spacing (SCS) includes:

determining a value of the symbol position configuration information by adding M 0s behind each symbol based on a value corresponding to original symbol position configuration information of the first periodic signal, where M is a first fixed value, the first fixed value being determined based on the subcarrier spacing (SCS).

Optionally, when the second configuration information includes symbol position configuration information, a value of the symbol position configuration information may be determined by adding M 0s behind each symbol based on a value corresponding to original symbol position configuration information of the first periodic signal, where M is a first fixed value and determined based on the subcarrier spacing (SCS).

Optionally, when the second configuration information includes the symbol position configuration information, the communications device may update the symbol position configuration information based on the subcarrier spacing (SCS) or may predefine the symbol position configuration information based on the subcarrier spacing (SCS), and the communications device uses the predefined symbol position configuration information when configuring the first periodic signal.

Optionally, the determining the first fixed value based on the subcarrier spacing (SCS) includes:

obtaining the first fixed value based on the subcarrier spacing (SCS); or predefining the first fixed value based on the subcarrier spacing (SCS).

Optionally, the update or predefinition of the symbol position configuration information is the update or predefinition based on the first fixed value. Therefore, when the second configuration information includes the symbol position configuration information, the communications device may update or predefine the first fixed value M based on the subcarrier spacing (SCS). When configuring the first periodic signal, the communications device uses the symbol position configuration information determined based on the predefined M.

Optionally, the determining the first fixed value based on the subcarrier spacing (SCS) includes:

determining a first fixed value corresponding to the SCS based on the subcarrier spacing (SCS); or determining a second mathematical relation between the SCS and a preset target reference SCS based on the subcarrier spacing (SCS) and obtaining the first fixed value through calculation based on the second mathematical relation.

Optionally, in updating the first fixed value based on the subcarrier spacing (SCS) and then updating the symbol position configuration information, or in predefining the first fixed value based on the subcarrier spacing (SCS), the first fixed value corresponding to the SCS can be determined based on the subcarrier spacing (SCS), and then the symbol position configuration information is determined.

For example, in updating the first fixed value based on the subcarrier spacing (SCS) and then updating the symbol position configuration information, or in predefining the first fixed value based on the subcarrier spacing (SCS), the first fixed value 3 corresponding to the SCS can be determined based on the subcarrier spacing (SCS) of 480 kHz. The first fixed value 7 corresponding to the SCS can be determined based on the subcarrier spacing (SCS) of 960 kHz.

Optionally, in updating the first fixed value based on the subcarrier spacing (SCS), or predefining the first fixed value based on the subcarrier spacing (SCS), a second mathematical relation between the SCS and a preset target reference SCS may be determined based on the subcarrier spacing (SCS), the first fixed value is obtained through calculation based on the second mathematical relation, and then the symbol position configuration information is obtained.

Optionally, a calculation rule in this embodiment may be predefined, that is, may be preconfigured or be predetermined by a protocol.

Optionally, the determining a second mathematical relation between the SCS and a preset target reference SCS based on the subcarrier spacing (SCS) and obtaining the first fixed value through calculation based on the second mathematical relation includes:

determining a quotient R between the SCS and a preset second reference SCS based on the subcarrier spacing (SCS), where R is a positive integer; and obtaining the first fixed value by subtracting 1 from R.

Optionally, in updating the first fixed value based on the subcarrier spacing (SCS) and then updating the symbol position configuration information, or in predefining the first fixed value based on the subcarrier spacing (SCS), the first fixed value may be obtained by determining a quotient R between the SCS and a preset second reference SCS based on the subcarrier spacing (SCS) and subtracting 1 from R, and then the symbol position configuration information is obtained.

For example, in updating the first fixed value based on the subcarrier spacing (SCS) and then updating the symbol position configuration information, or in predefining the first fixed value based on the subcarrier spacing (SCS), taking the second reference SCS of 120 kHz as an example, if the subcarrier spacing (SCS) of a BWP is 480 kHz, 480/120−1=3, so that the first fixed value 3 may be determined and then the symbol position configuration information is determined; and if the subcarrier spacing (SCS) of a BWP is 960 kHz, 960/120−1=7, so that the first fixed value 7 may be determined and then the symbol position configuration information is determined.

Figure 5:
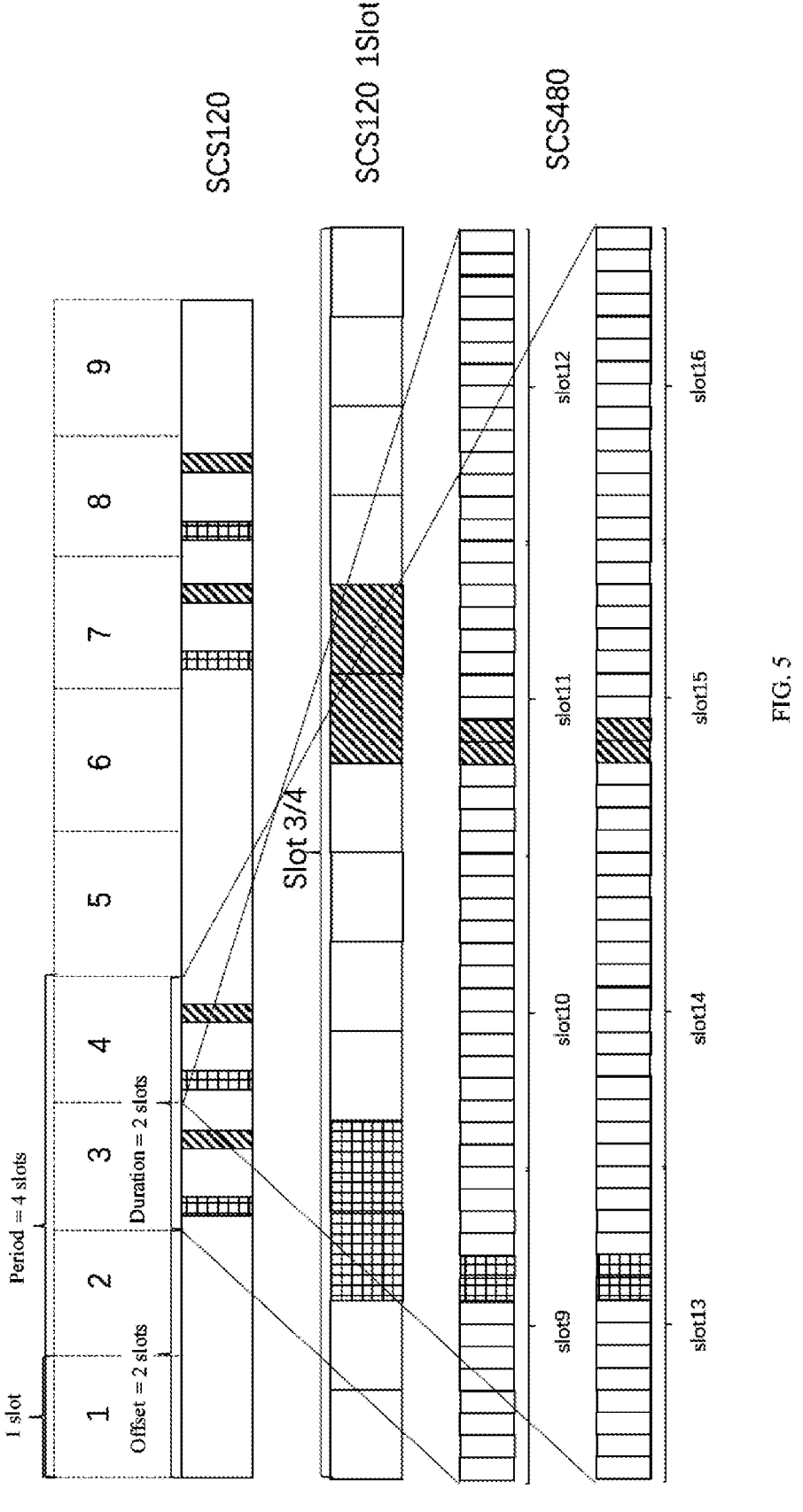
FIG. 5 is a second schematic diagram of a signal configuration method according to an embodiment of this application.

In an example in which the second configuration information includes the symbol position configuration information, FIG. 5 is a second schematic diagram of a signal configuration method according to an embodiment of this application. It should be noted that in this embodiment of this application, a periodicity and an initial slot for PDCCH monitoring may be determined based on the definition of monitoringSlotPeriodicityAndOffset. monitoringSlotPeriodicityAndOffset may be predefined or updated based on the SCS or may be directly predefined or unchanged. In this embodiment of this application, monitoring symbol(s) in each PDCCH monitoring slot may be directly determined by modifying the definition of monitoringSymbolsWithinSlot.

As shown in FIG. 5, assuming following configurations for a CORESET:

frequencyDomainResources=000111111111111—(3 0s, 12 1s):

representing that the CORESET with 12 consecutive PRBs starts from a PRB that is three PRBs offset relative to a position of PRB0; and Duration=2: representing that this CORESET occupies 2 consecutive OFDM symbols.

Assume that a search space is configured as follows:

monitoringSlotPeriodicityAndOffset=s14.2: representing that a search space periodicity is 4 slots and that an offset is 2 slots;

monitoringSymbolsWithinSlot=00100000100000: representing that in each slot, there are two occasions starting from the 3rd symbol and the 9th symbol respectively; and Duration=2 representing that a search space spans 2 consecutive slots and is present in each slot.

As shown in FIG. 5, slots 9, 10, 11, 12 of SCS480 correspond to slot 3 of SCS120; and slots 13, 14, 15, 16 of SCS480 correspond to slot 4 of SCS120.

The following schemes are both applicable to this embodiment of this application.

(a) A scheme of modifying only the definition of monitoringSymbolsWithinSlot; that is, the second configuration information includes only the symbol position configuration information.

The definition of monitoringSymbolsWithinSlot is modified directly. For example, if monitoringSymbolsWithinSlot=00100000100000 is configured in an existing protocol, then a first fixed value of 0 is added behind each symbol in monitoringSymbolsWithinSlot by default. In this case, the definition of the monitoringSymbolsWithinSlot is at symbol level.

Taking a SCS of a BWP=480 kHz and monitoringSymbolsWithinSlot=00100000100000 as an example, 3 0s are added behind each symbol in each monitoringSymbolsWithinSlot, then monitoringSymbolsWithinSlot=0000000010000000000000000000000000000100000-00000000000000000, and a search space to be monitored is at a symbol corresponding to the value of 1. An offset value may be added subsequently on the basis of this value.

(b) The second configuration information includes the symbol position configuration information and the duration information.

Optionally, the first fixed value may be predefined by a protocol. For example, 3 0s are added for the default SCS of 480 K; or 7 0s are added for SCS of 960 K; or a reference SCS is set, such as a SCS of 120K, an SCS of a BWP is divided by the reference SCS, and a resulting value minus 1 is used as the number of 0s to be added.

It should be noted that the offset value may be based on the slot or on the number of symbols. In the foregoing example, the offset value is 0.

It should be noted that the foregoing 2 schemes listed are only used as examples of this embodiment of this application and are not meant to limit this embodiment of this application.

Optionally, when the second configuration information includes the symbol position configuration information, the predefining the second configuration information includes:

determining a value of the symbol position configuration information by adding N 0s behind each symbol based on a value corresponding to original symbol position configuration information of the first periodic signal, where N is a second fixed value, the second fixed value being predefined.

Optionally, the second fixed value N may be predefined directly and then a value of the symbol position configuration information is determined by adding N 0s behind each symbol based on a value corresponding to original symbol position configuration information of the first periodic signal.

Optionally, when the second configuration information includes the duration information, the determining the second configuration information based on the subcarrier spacing (SCS) includes:

determining a slot spacing between slots based on the subcarrier spacing (SCS); and determining the duration information based on a time interval between the slots and the slot spacing; where the time interval between the slots is determined based on original duration information of the first periodic signal.

Optionally, when the second configuration information includes the duration information, the first periodic signal may be configured by determining the slot spacing between the slots based on the subcarrier spacing (SCS) and then determining the duration information in combination with the time interval between the slots.

Taking the duration information as Duration in a search space as an example, a time interval between slots may be determined based on original duration information of the first periodic signal. If it is determined that the first periodic signal is originally on 2 consecutive slots with a duration of 2 ms, on the basis of keeping the duration of 2 ms unchanged, the duration information M may be determined based on the updated or predefined slot spacing (it can be understood that search spaces to be monitored appear in M slots and a spacing between every two search spaces is the determined slot spacing), and then a position of other slot(s) for the first periodic signal may be determined.

Optionally, the determining the slot spacing between slots based on the subcarrier spacing (SCS) includes:

obtaining the slot spacing based on the subcarrier spacing (SCS); or predefining the slot spacing based on the subcarrier spacing (SCS).

Optionally, the update or predefinition of the duration information is the update or predefinition based on the slot spacing. Therefore, when the second configuration information includes the duration information, the communications device may update or predefine the slot spacing based on the subcarrier spacing (SCS). When configuring the first periodic signal, the communications device uses the duration information determined based on the predefined slot spacing.

Optionally, the determining the slot spacing between slots based on the subcarrier spacing (SCS) includes:

determining a slot spacing corresponding to the SCS based on the subcarrier spacing (SCS); or determining a third mathematical relation between the SCS and a preset target reference SCS based on the subcarrier spacing (SCS) and obtaining the slot spacing through calculation based on the third mathematical relation.

Optionally, in updating the slot spacing based on the subcarrier spacing (SCS) and then updating the duration information, or in predefining the slot spacing based on the subcarrier spacing (SCS), the duration information corresponding to the SCS can be determined based on the subcarrier spacing (SCS), and then the duration information is determined.

For example, in updating the slot spacing based on the subcarrier spacing (SCS) and then updating the duration information, or in predefining the slot spacing based on the subcarrier spacing (SCS), a slot spacing 4 corresponding to the SCS can be determined based on the subcarrier spacing (SCS) of 480 kHz. A slot spacing 8 corresponding to the SCS can be determined based on the subcarrier spacing (SCS) of 960 kHz.

Optionally, in updating the slot spacing based on the subcarrier spacing (SCS) and then updating the duration information, or predefining the slot spacing based on the subcarrier spacing (SCS), a third mathematical relation between the SCS and a preset target reference SCS may be determined based on the subcarrier spacing (SCS), the slot spacing is obtained through calculation based on the third mathematical relation, and then the duration information is obtained.

Optionally, a calculation rule in this embodiment may be predefined, that is, may be preconfigured or be predetermined by a protocol.

Optionally, the determining a third mathematical relation between the SCS and a preset target reference SCS based on the subcarrier spacing (SCS) and obtaining the slot spacing through calculation based on the third mathematical relation includes:

determining a quotient L between the SCS and a preset third reference SCS based on the subcarrier spacing (SCS), where L is a positive integer; and determining the slot spacing as L.

Optionally, in updating the slot spacing based on the subcarrier spacing (SCS) and then updating the duration information, or predefining the slot spacing based on the subcarrier spacing (SCS), a quotient L between the SCS and the preset third reference SCS may be determined based on the subcarrier spacing (SCS), the slot spacing is determined as L, and then the duration information is obtained.

For example, in updating the slot spacing based on the subcarrier spacing (SCS) and then updating the duration information, or in predefining the slot spacing based on the subcarrier spacing (SCS), taking the third reference SCS of 120 kHz as an example, if the subcarrier spacing (SCS) of a BWP is 480 kHz, 480/120=4, so that the slot spacing 4 may be determined and then the duration information is determined; and if the subcarrier spacing (SCS) of a BWP is 960 kHz, 960/120=8, so that the slot spacing 8 may be determined and then the duration information is determined.

Figure 6:
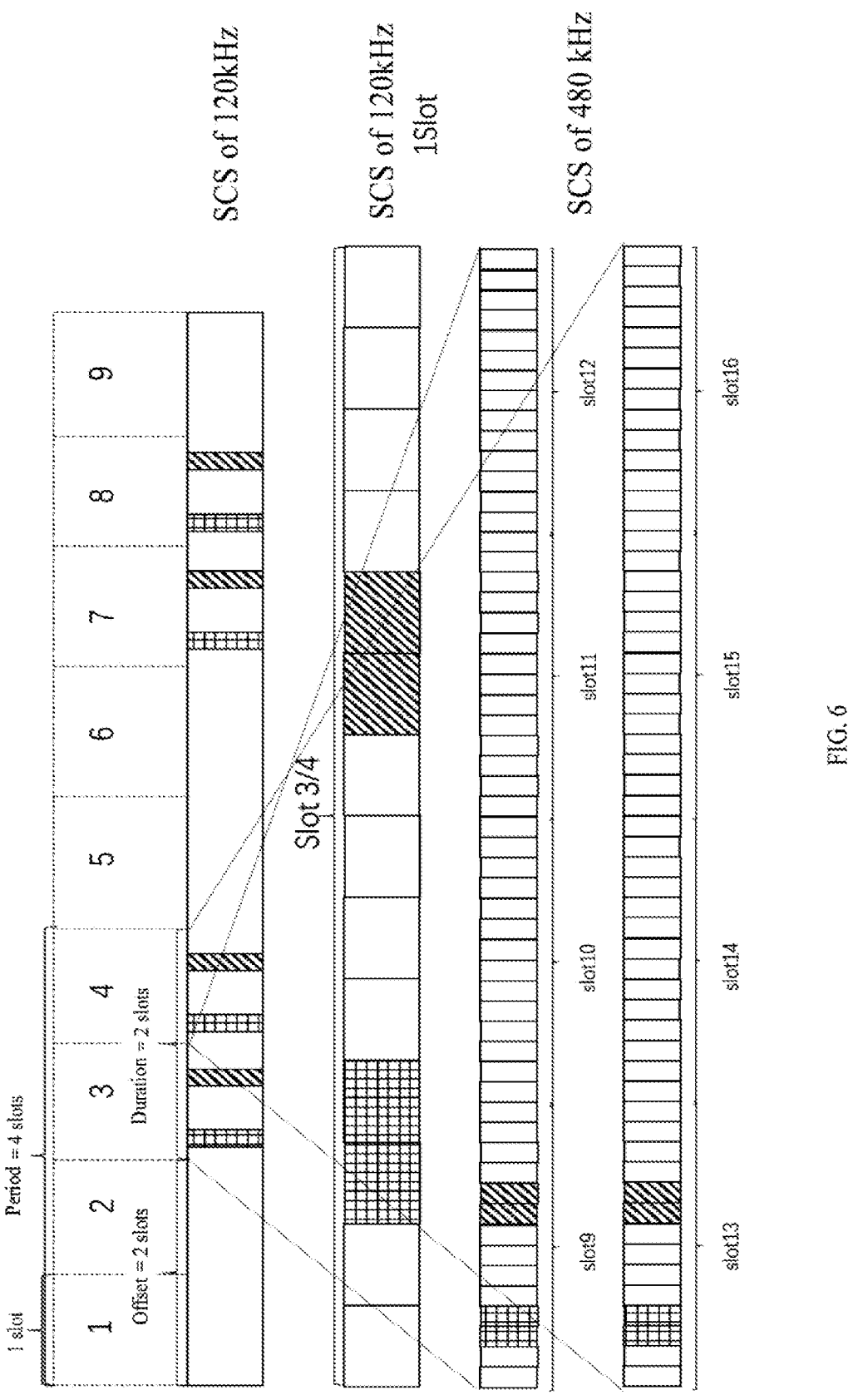
FIG. 6 is a third schematic diagram of a signal configuration method according to an embodiment of this application.

In an example in which the second configuration information includes the duration information, FIG. 6 is a third schematic diagram of a signal configuration method according to an embodiment of this application. It should be noted that in this embodiment of this application, a periodicity and an initial slot for PDCCH monitoring may be determined based on the definition of monitoringSlotPeriodicityAndOffset. monitoringSlotPeriodicityAndOffset may be predefined or updated based on the SCS or may be directly predefined or unchanged. In this embodiment of this application, a position(s) of subsequent slot(s) may be determined by modifying the definition of Duration, and a position of a monitoring symbol in each PDCCH monitoring slot may be determined through monitoringSymbolsWithinSlot.

As shown in FIG. 6, assuming following configurations for a CORESET:

frequencyDomainResources=000111111111111—(3 0s, 12 1s):

representing that the CORESET with 12 consecutive PRBs starts from a PRB that is three PRBs offset relative to a position of PRB0; and Duration=2: representing that this CORESET occupies 2 consecutive OFDM symbols.

Assume that a search space is configured as follows:

monitoringSlotPeriodicityAndOffset=s14.2: representing that a search space periodicity is 4 slots and that an offset is 2 slots;

monitoringSymbolsWithinSlot=00100000100000: representing that in each slot, there are two occasions starting from the 3rd symbol and the 9th symbol respectively; and Duration=2 representing that a search space spans 2 consecutive slots and is present in each slot.

As shown in FIG. 6, slots 9, 10, 11, 12 of SCS of 480 kHz correspond to slot 3 of SCS of 120 kHz; and slots 13, 14, 15, 16 of SCS of 480 kHz correspond to slot 4 of SCS of 120 kHz.

The following two schemes are applicable to this embodiment.

Scheme (c): A scheme of modifying only the definition of Duration; that is, the second configuration information includes only the duration information.

Optionally, the definition of duration may be modified directly. For example, if duration=M can be configured, search spaces to be monitored appear in M slots by default, and two slots in which the search space appears are separated by a second fix value number of slots. To be specific, after the definition of duration is modified, a second fixed value number of slots may appear between the search space that originally appeared in slot 3 and slot 4 consecutively. Therefore, the positions of these two search spaces become slot 9 and slot 13, but the time interval between these two search spaces remains unchanged.

Scheme (d): The second configuration information includes the duration information, periodicity configuration information, and slot offset information.

Optionally, a plurality of time domain positions of the search space may be determined together by combining content of the updated or predefined monitoringSlotPeriodicityAndOffset. As shown in FIG. 6, the periodicity configuration in monitoringSlotPeriodicityAndOffset may be updated or predefined, and in combination with the offset in the monitoringSlotPeriodicityAndOffset and the value in the Duration indicator field, a plurality of time domain positions of the search space may be determined, that is, (offset+duration{0, 1 . . . n})*fixed value+offset value.

As described in schemes (c) and (d), the slot spacing, which may be referred to as the second fixed value, may be predefined by a protocol, for example, multiplying by 4 for SCS of 480 kHz and 8 for SCS of 960K by default. Alternatively, a reference SCS is set, such as a SCS of 120 kHz, an SCS of a BWP is divided by the reference SCS, and a resulting value is used as the value to be multiplied.

It should be noted that the foregoing 2 schemes listed are only used as examples of this embodiment of this application and are not meant to limit this embodiment of this application.

It should be noted that the offset value may be based on the slot or on the number of symbols.

Optionally, the offset value is 0.

Optionally, when the second configuration information includes the duration information, the predefining the second configuration information includes:

predefining a slot spacing between slots; and determining the duration information based on a time interval between the slots and the slot spacing; where the time interval between the slots is determined based on original duration information of the first periodic signal.

Optionally, when the second configuration information includes the duration information, a slot spacing between slots may be predefined; and the duration information is determined based on a time interval between the slots and the slot spacing; where the time interval between the slots is determined based on the original duration information of the first periodic signal.

Optionally, in a case that the second configuration information includes the periodicity configuration information, the configuring a first periodic signal based on first configuration information includes:

determining a periodicity of the first periodic signal based on the periodicity configuration information in the second configuration information.

Optionally, the periodicity of the first periodic signal may be obtained directly based on a value of the periodicity configuration information or may be obtained after the value of the periodicity configuration information is updated.

In an example in which the periodicity configuration information is monitoringSlotPeriodicityAndOffset in a search space, the periodicity of the first periodic signal may be obtained directly based on a value of the periodicity in monitoringSlotPeriodicityAndOffset or may be obtained after the value of monitoringSlotPeriodicityAndOffset is updated.

Optionally, in a case that the second configuration information includes the slot offset information, the configuring a first periodic signal based on first configuration information includes:

determining a position of a target slot for the first periodic signal based on the slot offset information in the second configuration information.

Optionally, after the periodicity of the first periodic signal is determined, a position of a target slot such as the first slot in each periodic signal may be determined.

Optionally, the target slot may be a predefined slot, for example may be the first slot or the last slot of the first periodic signal.

Optionally, the position of the target slot for the first periodic signal may be obtained directly based on the slot offset information, or may be obtained after the value of the slot offset information is updated.

In an example in which the periodicity configuration information is the offset in monitoringSlotPeriodicityAndOffset in a search space, a position of a target slot for the first periodic signal may be obtained directly based on a value of the offset in monitoringSlotPeriodicityAndOffset or may be obtained after the value of the offset in monitoringSlotPeriodicityAndOffset is updated.

Optionally, in a case that the second configuration information includes the duration information, the configuring a first periodic signal based on first configuration information includes:

determining a time interval between slots for the first periodic signal based on the duration information in the second configuration information and determining positions of other slots based on the time interval, where the other slots include slots other than the target slot.

Optionally, after the position of the target slot in each periodicity, such as the position of the first slot, is determined, position(s) of the other slot(s) may be determined next.

Optionally, the target slot may be a predefined slot, for example may be the first slot or the last slot of the first periodic signal, and the other slots may be subsequent slot(s) for the first periodic signal.

Optionally, a time interval between slots for the first periodic signal may be determined based on the duration information in the second configuration information, and then the time interval is divided by a duration of each slot to obtain a position of another slot relative to the first slot.

Optionally, in a case that the second configuration information includes the symbol position configuration information, the configuring a first periodic signal based on first configuration information includes:

determining a symbol position for the first periodic signal in each slot based on the symbol position configuration information in the second configuration information.

Optionally, after a target slot and the other slot(s) in each periodicity are determined, a symbol position for the signal in each slot may be determined.

Optionally, in a case that the second configuration information includes the symbol position configuration information, the symbol position for the first periodic signal in each slot may be determined directly based on the symbol position configuration information in the second configuration information, or determined after the symbol position configuration information in the second configuration information is updated.

Optionally, periodicity information of the first periodic signal includes at least one of the following:

search space in a PDCCH;

channel state information reference signal (CSI-RS);

tracking reference signal (TRS);

received signal strength indicator (RSSI);

synchronization signal and PBCH block-measurement timing configuration information (SSB-MTC);

scheduling request information; and sounding reference signal (SRS).

Optionally, the periodicity information of the first periodic signal includes but is not limited to at least one of: search space in a PDCCH; channel state information reference signal (CSI-RS); tracking reference signal (TRS); received signal strength indicator (RSSI); synchronization signal and PBCH block-measurement timing configuration information (SSB-MTC); scheduling request information; and sounding reference signal (SRS).

Optionally, at least one of the above periodic information may be configured simultaneously based on the methods provided in the embodiments of this application.

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

It should be noted that the signal configuration method provided in this embodiment of this application may be performed by a signal configuration apparatus or a control module for performing the signal configuration method in the signal configuration apparatus. In this embodiment of this application, the signal configuration apparatus provided in this embodiment of this application is described by using the signal configuration method performed by a signal configuration apparatus as an example.

Figure 7:
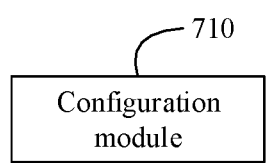
FIG. 7 is a schematic structural diagram of a signal configuration apparatus according to an embodiment of this application.

FIG. 7 is a schematic structural diagram of a signal configuration apparatus according to an embodiment of this application. As shown in FIG. 7, the apparatus includes a configuration module 710.

The configuration module 710 is configured to configure a first periodic signal based on first configuration information; where second configuration information in the first configuration information is determined based on a subcarrier spacing (SCS), and/or second configuration information in the first configuration information is predefined; and the first configuration information includes:

periodicity configuration information;

slot offset information;

duration information; and symbol position configuration information.

Optionally, the signal configuration apparatus may configure a first periodic signal based on first configuration information by using the configuration module.

It should be noted herein that the apparatus provided in this embodiment of this application can implement the all method steps implemented in the foregoing method embodiments, with the same technical effects achieved, and the same parts and beneficial effects in this embodiment as in the method embodiments are not described in detail here.

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

Optionally, the second configuration information includes at least one of the following:

periodicity configuration information;

slot offset information;

duration information; and symbol position configuration information.

Optionally, the apparatus further includes:

a first determining module, configured to determine the second configuration information based on the subcarrier spacing (SCS) when the second configuration information includes the periodicity configuration information and/or the slot offset information; where the first determining module is specifically configured to update the second configuration information based on the subcarrier spacing (SCS); or the first determining module is specifically configured to predefine the second configuration information based on the subcarrier spacing (SCS).

Optionally, the first determining module is further configured to:

determine a first calculation parameter corresponding to the SCS based on the subcarrier spacing (SCS) and obtain the second configuration information through calculation based on the first calculation parameter; or determine a first mathematical relation between the SCS and a preset target reference SCS based on the subcarrier spacing (SCS) and obtain the second configuration information through calculation based on the first mathematical relation.

Optionally, the first determining module is further configured to:

multiply original second configuration information by the first calculation parameter to obtain the second configuration information.

Optionally, the first determining module is further configured to:

determine, based on the subcarrier spacing (SCS), that the SCS is P times a preset first reference SCS; and multiply the original second configuration information by the multiplier P to obtain the second configuration information; where $0<P\leq 1$, or P is a positive integer.

Optionally, the apparatus further includes:

a second determining module, configured to predefine the second configuration information when the second configuration information includes the periodicity configuration information and/or the slot offset information; where the second determining module is specifically configured to predefine the periodicity configuration information and/or the slot offset information.

Optionally, the apparatus further includes:

a third determining module, configured to determine the second configuration information based on the subcarrier spacing (SCS) when the second configuration information includes the symbol position configuration information; where the third determining module is specifically configured to determine a value of the symbol position configuration information by adding M 0s behind each symbol based on a value corresponding to original symbol position configuration information of the first periodic signal, where M is a first fixed value, the first fixed value being determined based on the subcarrier spacing (SCS).

Optionally, the third determining module is further configured to:

obtain the first fixed value based on the subcarrier spacing (SCS); or predefine the first fixed value based on the subcarrier spacing (SCS).

Optionally, the third determining module is configured to:

determine a first fixed value corresponding to the SCS based on the subcarrier spacing (SCS); or determine a second mathematical relation between the SCS and a preset target reference SCS based on the subcarrier spacing (SCS) and obtain the first fixed value through calculation based on the second mathematical relation.

Optionally, the third determining module is configured to:

determine a quotient R between the SCS and a preset second reference SCS based on the subcarrier spacing (SCS), where R is a positive integer; and obtain the first fixed value by subtracting 1 from R.

Optionally, when the second configuration information includes the symbol position configuration information, the apparatus further includes:

a fourth determining module, configured to predefine the second configuration information; where the fourth determining module is specifically configured to determine a value of the symbol position configuration information by adding N 0s behind each symbol based on a value corresponding to original symbol position configuration information of the first periodic signal, where N is a second fixed value, the second fixed value being predefined.

Optionally, the apparatus further includes:

a fifth determining module, configured to determine the second configuration information based on the subcarrier spacing (SCS) when the second configuration information includes the duration information; where the fifth determining module is specifically configured to:

determine a slot spacing between slots based on the subcarrier spacing (SCS); and determine the duration information based on a time interval between the slots and the slot spacing; where the time interval between the slots is determined based on original duration information of the first periodic signal.

Optionally, the fifth determining module is specifically configured to:

obtain the slot spacing based on the subcarrier spacing (SCS); or predefine the slot spacing based on the subcarrier spacing (SCS).

Optionally, the fifth determining module is specifically configured to:

determine a slot spacing corresponding to the SCS based on the subcarrier spacing (SCS); or determine a third mathematical relation between the SCS and a preset target reference SCS based on the subcarrier spacing (SCS) and obtain the slot spacing through calculation based on the third mathematical relation.

Optionally, the fifth determining module is specifically configured to:

determine a quotient L between the SCS and a preset third reference SCS based on the subcarrier spacing (SCS), where L is a positive integer; and determine the slot spacing as L.

Optionally, the apparatus further includes:

a sixth determining module, configured to predefine the second configuration information when the second configuration information includes the duration information; where the sixth determining module is specifically configured to:

predefine a slot spacing between slots; and determine the duration information based on a time interval between the slots and the slot spacing; where the time interval between the slots is determined based on original duration information of the first periodic signal.

Optionally, the configuration module is configured to:

determine a periodicity of the first periodic signal based on the periodicity configuration information in the second configuration information in a case that the second configuration information includes the periodicity configuration information.

Optionally, the configuration module is configured to:

determine a position of a target slot for the first periodic signal based on the slot offset information in the second configuration information in a case that the second configuration information includes the slot offset information.

Optionally, the configuration module is configured to:

determine a time interval between slots for the first periodic signal based on the duration information in the second configuration information in a case that the second configuration information includes the duration information and determine positions of other slots based on the time interval, where the other slots include slots other than the target slot.

Optionally, the configuration module is configured to:

determine a symbol position for the first periodic signal in each slot based on the symbol position configuration information in the second configuration information in a case that the second configuration information includes the symbol position configuration information.

Optionally, periodicity information of the first periodic signal includes at least one of the following:

search space in a PDCCH;

channel state information reference signal (CSI-RS);

tracking reference signal (TRS);

received signal strength indicator (RSSI);

synchronization signal and PBCH block-measurement timing configuration information (SSB-MTC);

scheduling request information; and sounding reference signal (SRS).

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

The signal configuration apparatus in this embodiment of this application may be an apparatus or electronic device with an operating system, or may be a component, an integrated circuit, or a chip in a terminal. The electronic device may be a mobile electronic device or a non-mobile electronic device. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The signal configuration apparatus provided in this embodiment of this application can implement the processes implemented by the method embodiments in FIG. 2 to FIG. 6. To avoid repetition, details are not repeated herein.

Figure 8:
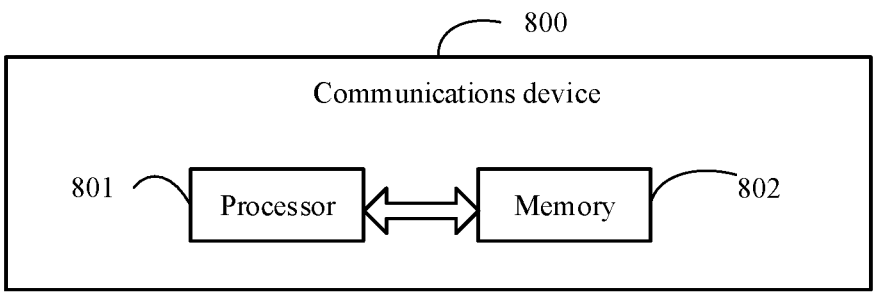
FIG. 8 is a schematic structural diagram of a communications device according to an embodiment of this application.

Optionally, FIG. 8 is a schematic structural diagram of a communications device according to an embodiment of this application. As shown in FIG. 8, a communications device 800 includes a processor 801, a memory 802, and a program or instructions stored in the memory 802 and capable of running on the processor 801. For example, when the communications device 800 is a terminal and when the program or instructions are executed by the processor 801, the processes of the foregoing method embodiments are implemented, with the same technical effects achieved. When the communications device 800 is a network-side device, the program or the instructions are executed by the processor 801 to implement the processes of the foregoing method embodiments, with same technical effects achieved. To avoid repetition, details are not repeated herein.

It is understood that the target communications device in this application may be a network-side device or a terminal.

Figure 9:
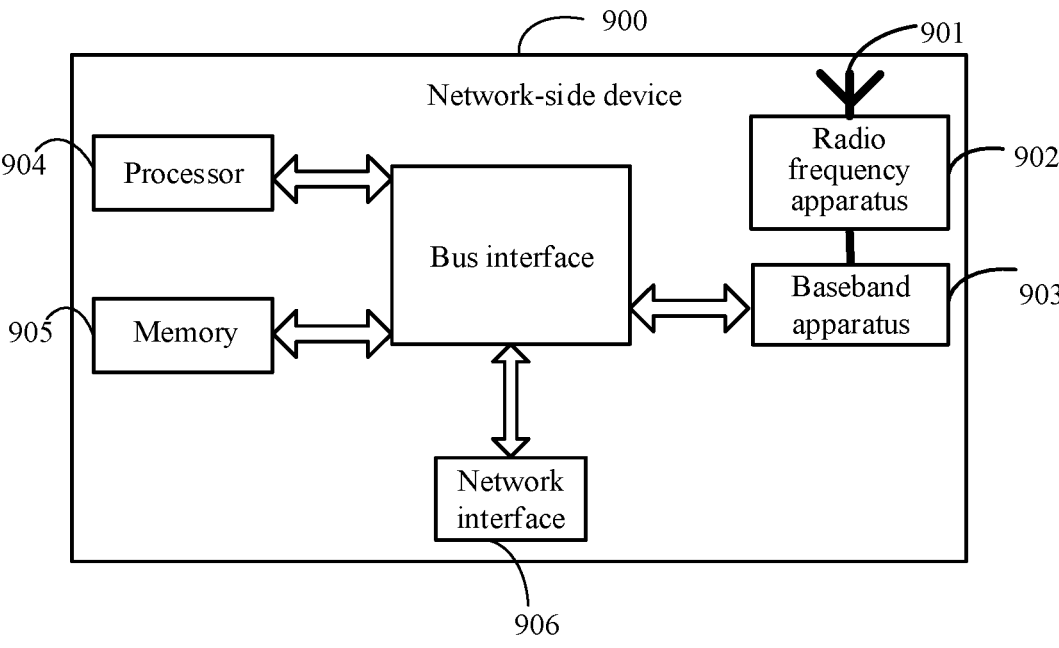
FIG. 9 is a schematic diagram of a hardware structure of a network-side device according to an embodiment of this application.

FIG. 9 is a schematic diagram of a hardware structure of a network-side device according to an embodiment of this application.

As shown in FIG. 9, the network-side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and transmits the received information to the baseband apparatus 903 for processing. In a downlink direction, the baseband apparatus 903 processes to-be-transmitted information, and transmits the information to the radio frequency apparatus 902; and the radio frequency apparatus 902 processes the received information and then transmits the information by using the antenna 901.

The frequency band processing apparatus may be located in the baseband apparatus 903. The method performed by the network-side device in the foregoing embodiments may be implemented in the baseband apparatus 903, and the baseband apparatus 903 includes a processor 904 and a memory 905.

The baseband apparatus 903 may include, for example, at least one baseband processing unit, where a plurality of chips are disposed on the baseband processing unit. As shown in FIG. 9, one of the chips is, for example, the processor 904, and connected to the memory 905, to invoke the program in the memory 905 to perform the operations of the network-side device shown in the foregoing method embodiments.

The baseband apparatus 903 may further include a network interface 906, configured to exchange information with the radio frequency apparatus 902, where the interface is, for example, a common public radio interface (CPRI).

Specifically, the network-side device in this embodiment of this application further includes instructions or a program stored in the memory 905 and capable of running on the processor 904. The processor 904 invokes the instructions or program in the memory 905 to perform the method performed by the modules shown in FIG. 7, with the same technical effects achieved. To avoid repetition, details are not repeated herein.

The processor 904 is configured to:

configure, a first periodic signal based on first configuration information; where second configuration information in the first configuration information is determined based on a subcarrier spacing (SCS), and/or second configuration information in the first configuration information is predefined; and the first configuration information includes:

periodicity configuration information;

slot offset information;

duration information; and symbol position configuration information.

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

Optionally, the second configuration information includes at least one of the following:

periodicity configuration information;

slot offset information;

duration information; and symbol position configuration information.

Optionally, when the second configuration information includes the periodicity configuration information and/or the slot offset information, the processor 904 is configured to:

update the second configuration information based on the subcarrier spacing (SCS); or predefine the second configuration information based on the subcarrier spacing (SCS).

Optionally, the processor 904 is configured to:

determine a first calculation parameter corresponding to the SCS based on the subcarrier spacing (SCS) and obtain the second configuration information through calculation based on the first calculation parameter; or determine a first mathematical relation between the SCS and a preset target reference SCS based on the subcarrier spacing (SCS) and obtain the second configuration information through calculation based on the first mathematical relation.

Optionally, the processor 904 is configured to:

multiply original second configuration information by the first calculation parameter to obtain the second configuration information.

Optionally, the processor 904 is configured to:

determine, based on the subcarrier spacing (SCS), that the SCS is P times a preset first reference SCS; and multiply the original second configuration information by the multiplier P to obtain the second configuration information; where $0<P\leq1$, or P is a positive integer.

Optionally, when the second configuration information includes the periodicity configuration information and/or the slot offset information, the processor 904 is configured to:

predefine the periodicity configuration information and/or the slot offset information.

Optionally, when the second configuration information includes the symbol position configuration information, the processor 904 is configured to:

determine a value of the symbol position configuration information by adding M 0s behind each symbol based on a value corresponding to original symbol position configuration information of the first periodic signal, where M is a first fixed value, the first fixed value being determined based on the subcarrier spacing (SCS).

Optionally, the processor 904 is configured to:

obtain the first fixed value based on the subcarrier spacing (SCS); or predefine the first fixed value based on the subcarrier spacing (SCS).

Optionally, the processor 904 is configured to:

determine a first fixed value corresponding to the SCS based on the subcarrier spacing (SCS); or determine a second mathematical relation between the SCS and a preset target reference SCS based on the subcarrier spacing (SCS) and obtain the first fixed value through calculation based on the second mathematical relation.

Optionally, the processor 904 is configured to:

determine a quotient R between the SCS and a preset second reference SCS based on the subcarrier spacing (SCS), where R is a positive integer; and obtain the first fixed value by subtracting 1 from R.

Optionally, when the second configuration information includes the symbol position configuration information, the processor 904 is configured to:

determine a value of the symbol position configuration information by adding N 0s behind each symbol based on a value corresponding to original symbol position configuration information of the first periodic signal, where N is a second fixed value, the second fixed value being predefined.

Optionally, when the second configuration information includes the duration information, the processor 904 is configured to:

determine a slot spacing between slots based on the subcarrier spacing (SCS); and determine the duration information based on a time interval between the slots and the slot spacing; where the time interval between the slots is determined based on original duration information of the first periodic signal.

Optionally, the processor 904 is configured to:

obtain the slot spacing based on the subcarrier spacing (SCS); or predefine the slot spacing based on the subcarrier spacing (SCS).

Optionally, the processor 904 is configured to:

determine a slot spacing corresponding to the SCS based on the subcarrier spacing (SCS); or determine a third mathematical relation between the SCS and a preset target reference SCS based on the subcarrier spacing (SCS) and obtain the slot spacing through calculation based on the third mathematical relation.

Optionally, the processor 904 is configured to:

determine a quotient L between the SCS and a preset third reference SCS based on the subcarrier spacing (SCS), where L is a positive integer; and determine the slot spacing as L.

Optionally, when the second configuration information includes the duration information, the processor 904 is configured to:

predefine a slot spacing between slots; and determine the duration information based on a time interval between the slots and the slot spacing; where the time interval between the slots is determined based on original duration information of the first periodic signal.

Optionally, in a case that the second configuration information includes the periodicity configuration information, the processor 904 is configured to:

determine a periodicity of the first periodic signal based on the periodicity configuration information in the second configuration information.

Optionally, in a case that the second configuration information includes the slot offset information, the processor 904 is configured to:

determine a position of a target slot for the first periodic signal based on the slot offset information in the second configuration information.

Optionally, in a case that the second configuration information includes the duration information, the processor 904 is configured to:

determine a time interval between slots for the first periodic signal based on the duration information in the second configuration information and determine positions of other slots based on the time interval, where the other slots include slots other than the target slot.

Optionally, in a case that the second configuration information includes the symbol position configuration information, the processor 904 is configured to:

determine a symbol position for the first periodic signal in each slot based on the symbol position configuration information in the second configuration information.

Optionally, periodicity information of the first periodic signal includes at least one of the following:

search space in a PDCCH;

channel state information reference signal (CSI-RS);

tracking reference signal (TRS);

received signal strength indicator (RSSI);

synchronization signal and PBCH block-measurement timing configuration information (SSB-MTC);

scheduling request information; and sounding reference signal (SRS).

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

The network-side device embodiment in this embodiment of this application is a product embodiment corresponding to the foregoing method embodiments, and all the implementations in the foregoing method embodiments are applicable to this network-side device embodiment, with the same or similar technical effects achieved. Details are not repeated herein.

Figure 10:
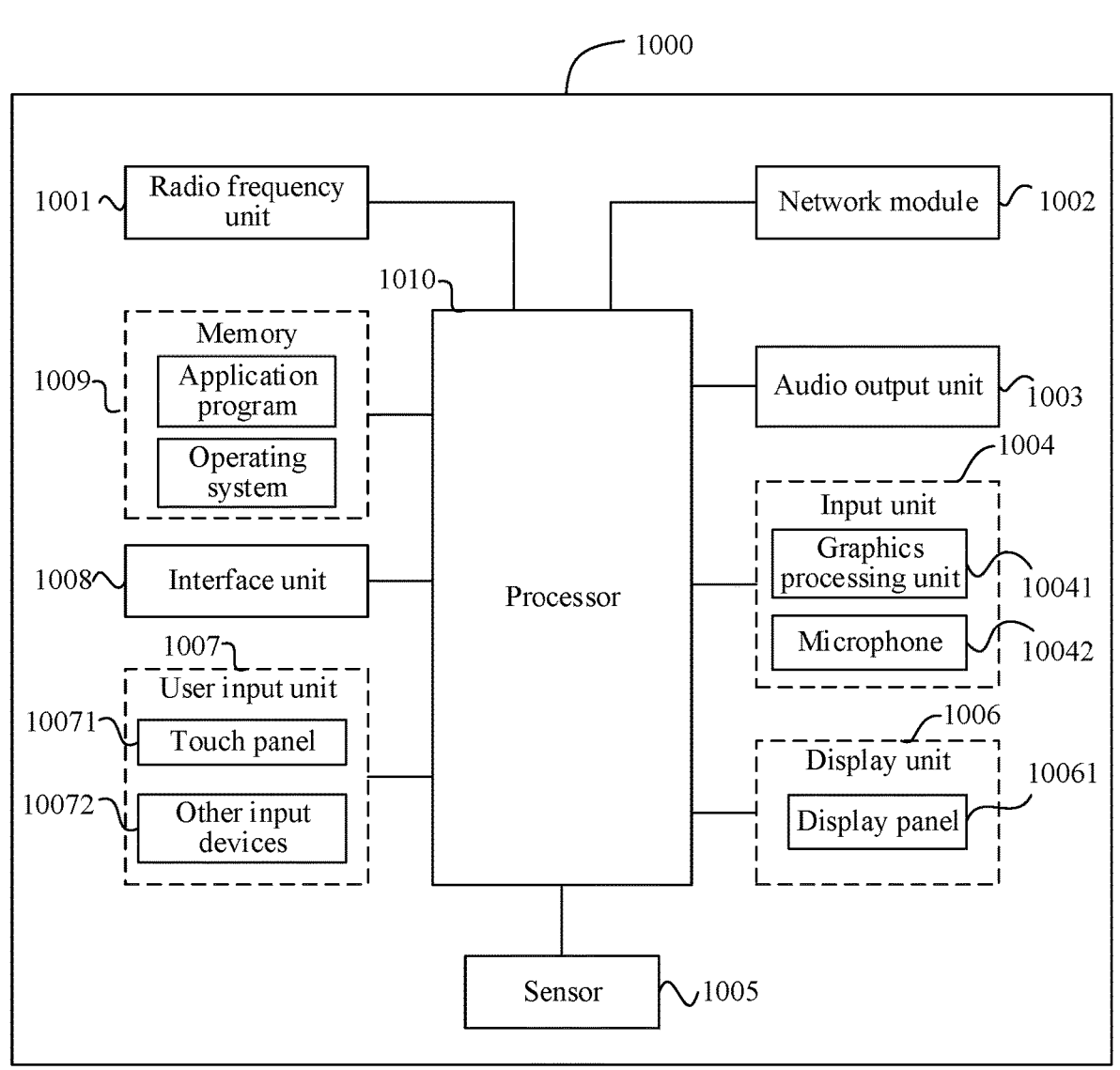
FIG. 10 is a schematic diagram of a hardware structure of a terminal according to an embodiment of this application.

FIG. 10 is a schematic diagram of a hardware structure of a terminal according to an embodiment of this application.

The terminal 1000 includes but is not limited to at least some of the components such as a radio frequency unit 1001, a network module 1002, an audio output unit 1003, an input unit 1004, a sensor 1005, a display unit 10010, a user input unit 1007, an interface unit 1008, a memory 1009, and a processor 1010.

Those skilled in the art can understand that the terminal 1000 may further include a power supply (for example, a battery) that supplies power to various components. The power supply may be logically connected to the processor 1010 through a power management system, so that functions such as charge and discharge management and power consumption management are implemented by using the power management system. The terminal is not limited to the terminal structure shown in FIG. 10. The terminal may include more or fewer components than shown in the figure, or combine some of the components, or arrange the components differently. Details are not described herein.

It should be understood that in this embodiment of this application, the input unit 1004 may include a graphics processing unit (GPU) 10041 and a microphone 10042. The graphics processing unit 10041 processes image data of a static picture or a video that is obtained by an image capture apparatus (for example, a camera) in a video capture mode or an image capture mode. The display unit 1006 may include the display panel 10061. The display panel 10061 may be configured in a form of a liquid crystal display, an organic light-emitting diode, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function button (for example, a volume control button or a power button), a trackball, a mouse, and a joystick. Details are not described herein.

In this embodiment of this application, the radio frequency unit 1001 receives information from a communications peer, and then sends the information to the processor

1010 for processing; and also sends to the communications peer the information to be transmitted. Generally, the radio frequency unit 1001 includes but is not limited to an antenna, at least one amplifier, a transceiver, a coupler, a low noise amplifier, and a duplexer.

The memory 1009 may be configured to store software programs or instructions and various data. The memory 1009 may mainly include a program or instructions storage area and a data storage area. The program or instructions storage area may store an operating system, an application program or instructions required by at least one function (for example, an audio play function or an image play function), and the like. In addition, the memory 1009 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or other non-volatile solid-state storage devices.

The processor 1010 may include one or more processing units. Optionally, the processor 1010 may integrate an application processor and a modem processor. The application processor mainly processes an operating system, a user interface, an application program or instructions, and the like. The modem processor mainly processes wireless communication, and for example, may be a baseband processor. It can be understood that the modem processor may be alternatively not integrated in the processor 1010.

The processor 1010 is configured to:
configure, configure a first periodicity signal based on first configuration information; where
second configuration information in the first configuration information is determined based on a subcarrier spacing (SCS), and/or second configuration information in the first configuration information is predefined; and
the first configuration information includes:
periodicity configuration information;
slot offset information;
duration information; and
symbol position configuration information.

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

Optionally, the second configuration information includes at least one of the following:
periodicity configuration information;
slot offset information;
duration information; and
symbol position configuration information.

Optionally, when the second configuration information includes the periodicity configuration information and/or the slot offset information, the processor 1010 is configured to:
update the second configuration information based on the subcarrier spacing (SCS); or
predefine the second configuration information based on the subcarrier spacing (SCS).

Optionally, the processor 1010 is configured to:
determine a first calculation parameter corresponding to the SCS based on the subcarrier spacing (SCS) and obtain the second configuration information through calculation based on the first calculation parameter; or
determine a first mathematical relation between the SCS and a preset target reference SCS based on the subcarrier spacing (SCS) and obtain the second configuration information through calculation based on the first mathematical relation.

Optionally, the processor 1010 is configured to:
multiply original second configuration information by the first calculation parameter to obtain the second configuration information.

Optionally, the processor 1010 is configured to:
determine, based on the subcarrier spacing (SCS), that the SCS is P times a preset first reference SCS; and
multiply the original second configuration information by the multiplier P to obtain the second configuration information; where
$0 < P \leq 1$, or P is a positive integer.

Optionally, when the second configuration information includes the periodicity configuration information and/or the slot offset information, the processor 1010 is configured to:
predefine the periodicity configuration information and/or the slot offset information.

Optionally, when the second configuration information includes the symbol position configuration information, the processor 1010 is configured to:
determine a value of the symbol position configuration information by adding M 0s behind each symbol based on a value corresponding to original symbol position configuration information of the first periodic signal, where
M is a first fixed value, the first fixed value being determined based on the subcarrier spacing (SCS).

Optionally, the processor 1010 is configured to:
obtain the first fixed value based on the subcarrier spacing (SCS); or
predefine the first fixed value based on the subcarrier spacing (SCS).

Optionally, the processor 1010 is configured to:
determine a first fixed value corresponding to the SCS based on the subcarrier spacing (SCS); or
determine a second mathematical relation between the SCS and a preset target reference SCS based on the subcarrier spacing (SCS) and obtain the first fixed value through calculation based on the second mathematical relation.

Optionally, the processor 1010 is configured to:
determine a quotient R between the SCS and a preset second reference SCS based on the subcarrier spacing (SCS), where R is a positive integer; and
obtain the first fixed value by subtracting 1 from R.

Optionally, when the second configuration information includes the symbol position configuration information, the processor 1010 is configured to:
determine a value of the symbol position configuration information by adding N 0s behind each symbol based on a value corresponding to original symbol position configuration information of the first periodic signal, where
N is a second fixed value, the second fixed value being predefined.

Optionally, when the second configuration information includes the duration information, the processor 1010 is configured to:
determine a slot spacing between slots based on the subcarrier spacing (SCS); and determine the duration information based on a time interval between the slots and the slot spacing; where the time interval between the slots is determined based on original duration information of the first periodic signal.

Optionally, the processor 1010 is configured to:

obtain the slot spacing based on the subcarrier spacing (SCS); or predefine the slot spacing based on the subcarrier spacing (SCS).

Optionally, the processor 1010 is configured to:

determine a slot spacing corresponding to the SCS based on the subcarrier spacing (SCS); or determine a third mathematical relation between the SCS and a preset target reference SCS based on the subcarrier spacing (SCS) and obtain the slot spacing through calculation based on the third mathematical relation.

Optionally, the processor 1010 is configured to:

determine a quotient L between the SCS and a preset third reference SCS based on the subcarrier spacing (SCS), where L is a positive integer; and determine the slot spacing as L.

Optionally, when the second configuration information includes the duration information, the processor 1010 is configured to:

predefine a slot spacing between slots; and determine the duration information based on a time interval between the slots and the slot spacing; where the time interval between the slots is determined based on original duration information of the first periodic signal.

Optionally, in a case that the second configuration information includes the periodicity configuration information, the processor 1010 is configured to:

determine a periodicity of the first periodic signal based on the periodicity configuration information in the second configuration information.

Optionally, in a case that the second configuration information includes the slot offset information, the processor 1010 is configured to:

determine a position of a target slot for the first periodic signal based on the slot offset information in the second configuration information.

Optionally, in a case that the second configuration information includes the duration information, the processor 1010 is configured to:

determine a time interval between slots for the first periodic signal based on the duration information in the second configuration information and determine positions of other slots based on the time interval, where the other slots include slots other than the target slot.

Optionally, in a case that the second configuration information includes the symbol position configuration information, the processor 1010 is configured to:

determine a symbol position for the first periodic signal in each slot based on the symbol position configuration information in the second configuration information.

Optionally, periodicity information of the first periodic signal includes at least one of the following:

search space in a PDCCH;

channel state information reference signal (CSI-RS);

tracking reference signal (TRS);

received signal strength indicator (RSSI);

synchronization signal and PBCH block-measurement timing configuration information (SSB-MTC);

scheduling request information; and sounding reference signal (SRS).

In this embodiment of this application, the configuration information of a periodic signal is determined based on a subcarrier spacing (SCS) and/or the configuration information of a first periodic signal is predefined, which allows more appropriate resource configuration for the periodic signal, adapts to configuration of the periodic signal in case of a plurality of subcarrier spacings, reduces complexity of blind detection of the terminal, and reduces the requirements for data processing capability of the terminal.

The terminal embodiment in this embodiment of this application is a product embodiment corresponding to the foregoing method embodiments, and all the implementations in the foregoing method embodiments are applicable to this terminal embodiment, with the same or similar technical effects achieved. Details are not repeated herein.

An embodiment of this application further provides a readable storage medium. The readable storage medium stores a program or instructions. When the program or instructions are executed by a processor, the processes of the foregoing embodiments of the signal configuration methods are implemented, with the same technical effects achieved. To avoid repetition, details are not repeated herein.

The processor is the processor of the terminal in the foregoing embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communications interface. The communications interface is coupled to the processor. The processor is configured to run a program or instructions of a device to implement the processes of the foregoing embodiments of the signal configuration methods, with the same technical effects achieved. To avoid repetition, details are not repeated herein.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-transitory storage medium. When the computer program product is executed by at least one processor, the steps of the foregoing embodiments of the signal configuration methods are implemented, with the same technical effects achieved. To avoid repetition, details are not repeated herein.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another element in a process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not repeated herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between the apparatuses, modules, or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this disclosure may be integrated into one processing unit, or each of the units may exist alone physically, or two or more units are integrated into one unit.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners shall fall within the protection scope of this application.

What is claimed is:

1. A signal configuration method, wherein the method comprises:
configuring, by a communications device based on first configuration information, a first periodic signal; wherein
second configuration information in the first configuration information is determined based on a subcarrier spacing (SCS), and/or second configuration information in the first configuration information is predefined; and
the first configuration information comprises:
periodicity configuration information;
slot offset information;
duration information; and
symbol position configuration information;
wherein the second configuration information comprises:
symbol position configuration information;
wherein when the second configuration information comprises the symbol position configuration information, the determining the second configuration information based on the subcarrier spacing (SCS) comprises:
determining a value of the symbol position configuration information by adding a M number of zero values (0s) behind each symbol based on a value corresponding to original symbol position configuration information of the first periodic signal, wherein
M is a first fixed value, the first fixed value being determined based on the subcarrier spacing (SCS).

2. The signal configuration method according to claim 1, wherein the second configuration information further comprises at least one of the following:
periodicity configuration information;
slot offset information;
duration information.

3. The signal configuration method according to claim 2, wherein when the second configuration information comprises the periodicity configuration information and/or the slot offset information, the determining the second configuration information based on the subcarrier spacing (SCS) comprises:
updating the second configuration information based on the subcarrier spacing (SCS); or
predefining the second configuration information based on the subcarrier spacing (SCS).

4. The signal configuration method according to claim 3, wherein the determining the second configuration information based on the subcarrier spacing (SCS) comprises:
determining a first calculation parameter corresponding to the SCS based on the subcarrier spacing (SCS) and obtaining the second configuration information through calculation based on the first calculation parameter; or
determining a first mathematical relation between the SCS and a preset target reference SCS based on the subcarrier spacing (SCS) and obtaining the second configuration information through calculation based on the first mathematical relation.

5. The signal configuration method according to claim 4, wherein the obtaining the second configuration information through calculation based on the first calculation parameter comprises:

multiplying original second configuration information by the first calculation parameter to obtain the second configuration information.

6. The signal configuration method according to claim 4, wherein the determining a first mathematical relation between the SCS and a preset target reference SCS based on the subcarrier spacing (SCS) and obtaining the second configuration information through calculation based on the first mathematical relation comprises:

determining, based on the subcarrier spacing (SCS), that the SCS is P times a preset first reference SCS; and multiplying the original second configuration information by the multiplier P to obtain the second configuration information; wherein $0<P\leq1$, or P is a positive integer.

7. The signal configuration method according to claim 2, wherein when the second configuration information comprises the periodicity configuration information and/or the slot offset information, the predefining the second configuration information comprises:

predefining the periodicity configuration information and/or the slot offset information.

8. The signal configuration method according to claim 1, wherein the determining the first fixed value based on the subcarrier spacing (SCS) comprises:

obtaining the first fixed value based on the subcarrier spacing (SCS); or predefining the first fixed value based on the subcarrier spacing (SCS).

9. The signal configuration method according to claim 8, wherein the determining the first fixed value based on the subcarrier spacing (SCS) comprises:

determining a first fixed value corresponding to the SCS based on the subcarrier spacing (SCS); or determining a second mathematical relation between the SCS and a preset target reference SCS based on the subcarrier spacing (SCS) and obtaining the first fixed value through calculation based on the second mathematical relation.

10. The signal configuration method according to claim 9, wherein the determining a second mathematical relation between the SCS and a preset target reference SCS based on the subcarrier spacing (SCS) and obtaining the first fixed value through calculation based on the second mathematical relation comprises:

determining a quotient R between the SCS and a preset second reference SCS based on the subcarrier spacing (SCS), wherein R is a positive integer; and obtaining the first fixed value by subtracting 1 from R.

11. The signal configuration method according to claim 2, wherein when the second configuration information comprises the symbol position configuration information, the predefining the second configuration information comprises:

determining a value of the symbol position configuration information by adding a N number of zero values (0s) behind each symbol based on a value corresponding to original symbol position configuration information of the first periodic signal, wherein N is a second fixed value, the second fixed value being predefined.

12. The signal configuration method according to claim 2, wherein when the second configuration information comprises the duration information, the determining the second configuration information based on the subcarrier spacing (SCS) comprises:

determining a slot spacing between slots based on the subcarrier spacing (SCS); and determining the duration information based on a time interval between the slots and the slot spacing; wherein the time interval between the slots is determined based on original duration information of the first periodic signal.

13. The signal configuration method according to claim 12, wherein the determining a slot spacing between slots based on the subcarrier spacing (SCS) comprises:

obtaining the slot spacing based on the subcarrier spacing (SCS); or predefining the slot spacing based on the subcarrier spacing (SCS).

14. The signal configuration method according to claim 13, wherein the determining a slot spacing between slots based on the subcarrier spacing (SCS) comprises:

determining a slot spacing corresponding to the SCS based on the subcarrier spacing (SCS); or determining a third mathematical relation between the SCS and a preset target reference SCS based on the subcarrier spacing (SCS) and obtaining the slot spacing through calculation based on the third mathematical relation.

15. The signal configuration method according to claim 14, wherein the determining a third mathematical relation between the SCS and a preset target reference SCS based on the subcarrier spacing (SCS) and obtaining the slot spacing through calculation based on the third mathematical relation comprises:

determining a quotient L between the SCS and a preset third reference SCS based on the subcarrier spacing (SCS), wherein L is a positive integer; and determining the slot spacing as L.

16. The signal configuration method according to claim 2, wherein when the second configuration information comprises the duration information, the predefining the second configuration information comprises:

predefining a slot spacing between slots; and determining the duration information based on a time interval between the slots and the slot spacing; wherein the time interval between the slots is determined based on original duration information of the first periodic signal.

17. The signal configuration method according to claim 2, wherein when the second configuration information comprises the periodicity configuration information, the configuring a first periodic signal based on first configuration information comprises:

determining a periodicity of the first periodic signal based on the periodicity configuration information in the second configuration information; or, when the second configuration information comprises the slot offset information, the configuring a first periodic signal based on first configuration information comprises:

determining a position of a target slot for the first periodic signal based on the slot offset information in the second configuration information; or, when the second configuration information comprises the duration information, the configuring a first periodic signal based on first configuration information comprises:

determining a time interval between slots for the first periodic signal based on the duration information in the second configuration information and determining positions of other slots based on the time interval, wherein the other slots comprise slots other than a target slot; or, when the second configuration information comprises the symbol position configuration information, the configuring a first periodic signal based on first configuration information comprises:

determining a symbol position for the first periodic signal in each slot based on the symbol position configuration information in the second configuration information.

18. The signal configuration method according to claim 1, wherein periodicity information of the first periodic signal comprises at least one of the following:

search space in a PDCCH;

channel state information reference signal (CSI-RS);

tracking reference signal (TRS);

received signal strength indicator (RSSI);

synchronization signal and PBCH block-measurement timing configuration information (SSB-MTC);

scheduling request information; and sounding reference signal (SRS).

19. A communications device, comprising a processor, a memory, and a program or instructions stored in the memory and capable of running on the processor, wherein the program or instructions are executed by the processor to perform:

configuring a first periodic signal based on first configuration information; wherein second configuration information in the first configuration information is determined based on a subcarrier spacing (SCS), and/or second configuration information in the first configuration information is predefined; and the first configuration information comprises:

periodicity configuration information;

slot offset information;

duration information; and symbol position configuration information;

wherein the second configuration information comprises:

symbol position configuration information;

wherein when the second configuration information comprises the symbol position configuration information, the determining the second configuration information based on the subcarrier spacing (SCS) comprises:

determining a value of the symbol position configuration information by adding a M number of zero values (0s) behind each symbol based on a value corresponding to original symbol position configuration information of the first periodic signal, wherein M is a first fixed value, the first fixed value being determined based on the subcarrier spacing (SCS).

\* \* \* \* \*